(12) United States Patent
Pryor

(10) Patent No.: US 7,466,843 B2
(45) Date of Patent: Dec. 16, 2008

(54) MULTI-FUNCTIONAL CONTROL AND ENTERTAINMENT SYSTEMS

(76) Inventor: Timothy R. Pryor, 416 Old Tecumseh Road, Lakeshore, Ontario (CA) N8N 3S8

( * ) Notice: Subject to any disclaimer, the term of this patent is extended or adjusted under 35 U.S.C. 154(b) by 50 days.

(21) Appl. No.: 11/184,076

(22) Filed: Jul. 19, 2005

(65) Prior Publication Data

US 2005/0276448 A1   Dec. 15, 2005

Related U.S. Application Data

(63) Continuation-in-part of application No. 10/934,762, filed on Sep. 7, 2004, and a continuation-in-part of application No. 10/893,534, filed on Jul. 19, 2004, and a continuation-in-part of application No. PCT/US2004/009701, filed on Mar. 31, 2004, and a continuation-in-part of application No. 10/611,814, filed on Jul. 2, 2003, which is a continuation of application No. 09/612,225, filed on Jul. 7, 2000, now Pat. No. 6,766,036, and a continuation-in-part of application No. 09/789,538, filed on Feb. 22, 2001, now Pat. No. 7,084,859.

(60) Provisional application No. 60/650,554, filed on Feb. 8, 2005, provisional application No. 60/598,446, filed on Aug. 4, 2004, provisional application No. 60/591,213, filed on Jul. 27, 2004.

(51) Int. Cl.
*G06K 9/00* (2006.01)

(52) U.S. Cl. .................................................. 382/103
(58) Field of Classification Search ................ 382/103; 353/14; 348/734; 345/158, 172, 173
See application file for complete search history.

(56) References Cited

U.S. PATENT DOCUMENTS

| | | | | |
|---|---|---|---|---|
| 3,609,695 A | * | 9/1971 | Pirkle | 345/175 |
| 4,993,806 A | * | 2/1991 | Clausen et al. | 359/456 |
| 5,572,239 A | * | 11/1996 | Jaeger | 345/172 |
| 5,594,469 A | * | 1/1997 | Freeman et al. | 345/158 |
| 6,478,432 B1 | * | 11/2002 | Dyner | 359/858 |
| 6,501,515 B1 | * | 12/2002 | Iwamura | 348/734 |
| 6,697,721 B2 | * | 2/2004 | Arlinsky | 701/36 |
| 7,084,859 B1 | * | 8/2006 | Pryor | 345/173 |

* cited by examiner

*Primary Examiner*—Tom Y Lu
(74) *Attorney, Agent, or Firm*—Stites & Harbison PLLC; Douglas E. Jackson

(57) ABSTRACT

For use in vehicles, it is desirable to have multi-functional (also known as reconfigurable) controls in the center stack portion of the instrument panel in order to best provide electronic and telematic functions to the driver. Disclosed are methods and apparatus to allow reconfiguration of classical controls such as knobs, sliders, and switches most familiar to the vast majority of the motoring public which may, if desired, utilize conventional flat panel displays (e.g., LCD based) and conventional readout electronics and switching. Also disclosed are projection based controls and new forms of rear seat entertainment controls and related apparatus for minivans and other vehicles.

12 Claims, 31 Drawing Sheets

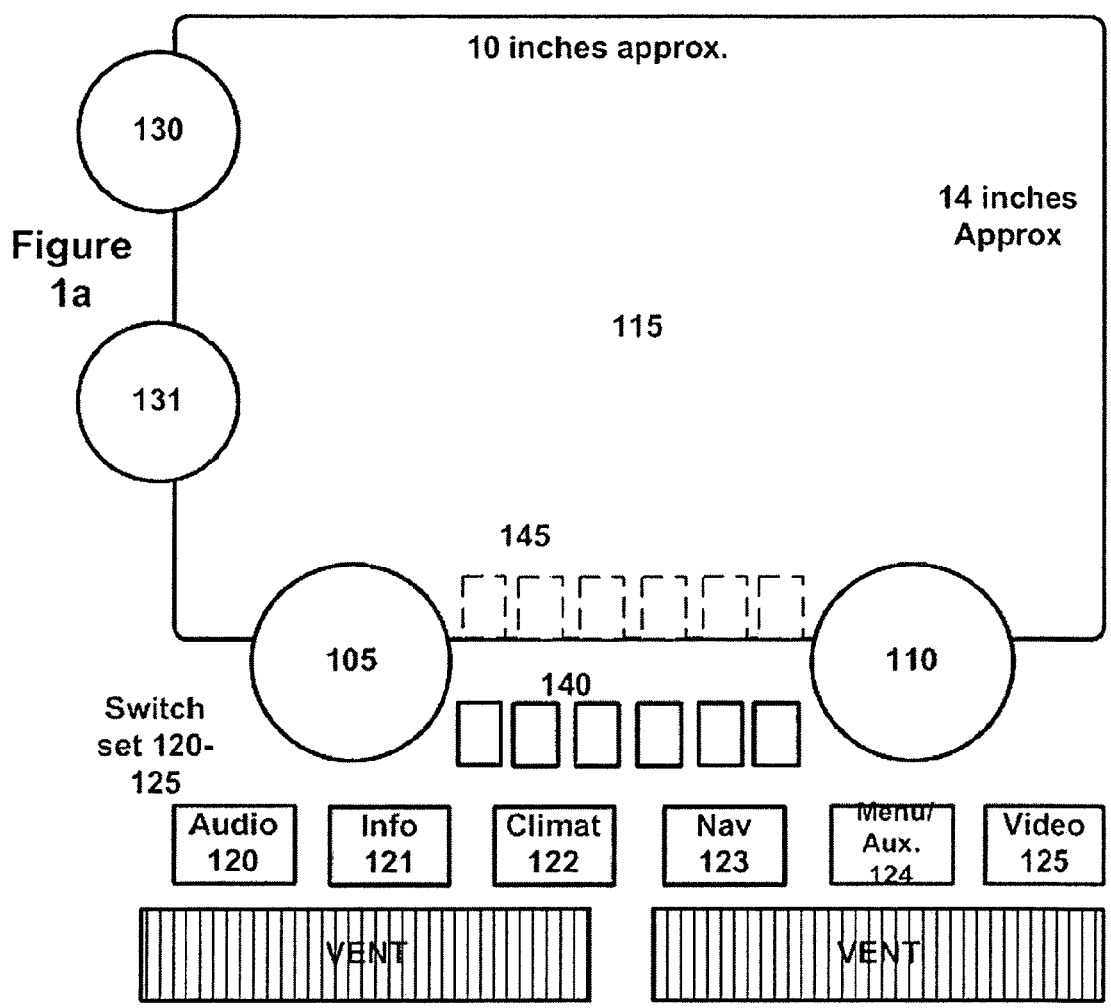

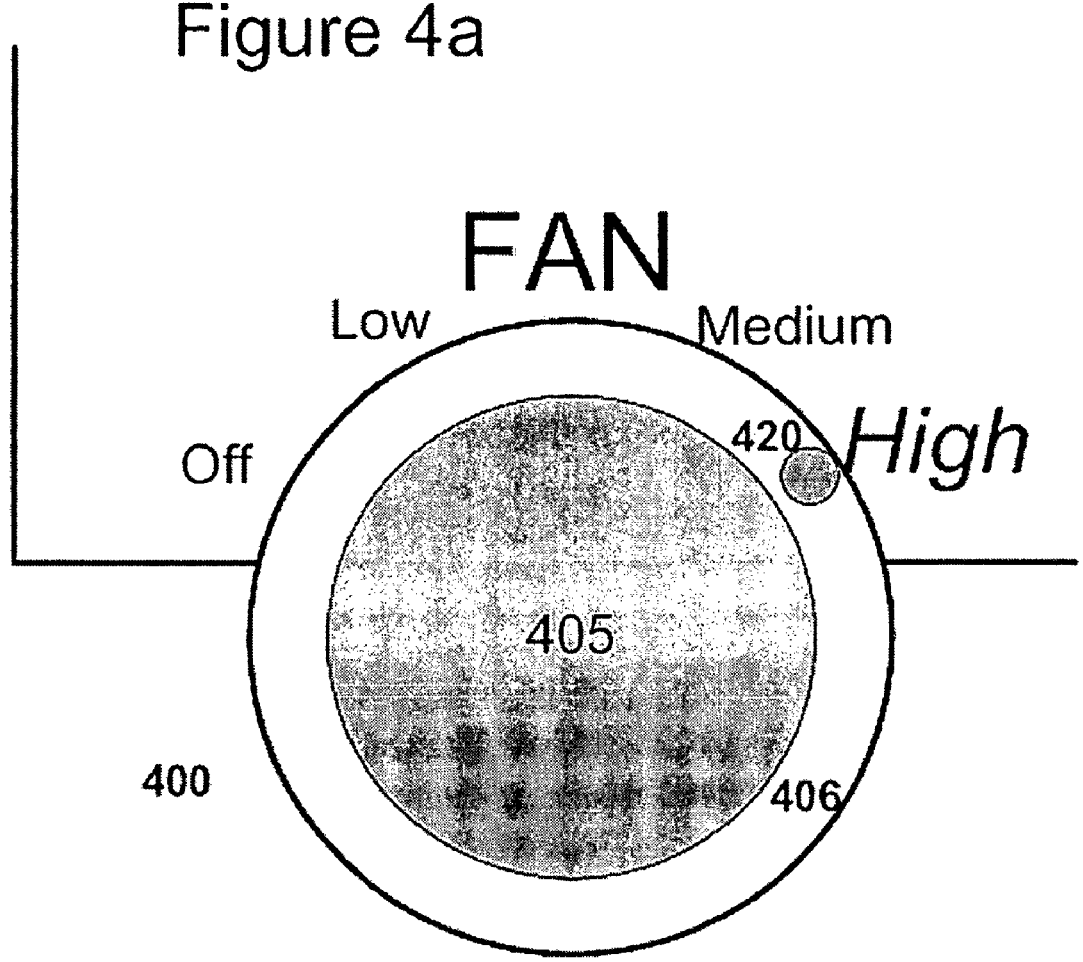

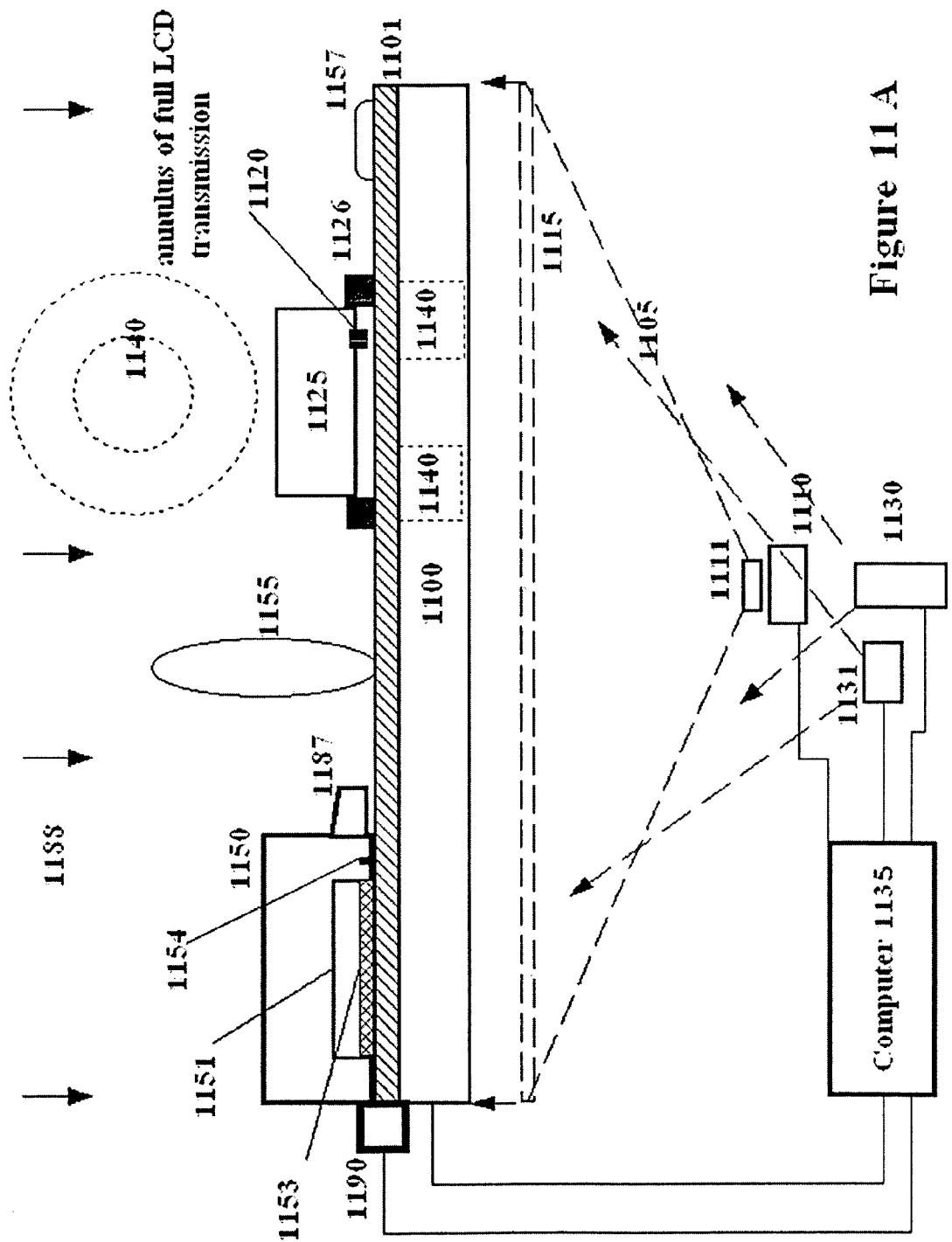

optional trim strip label example

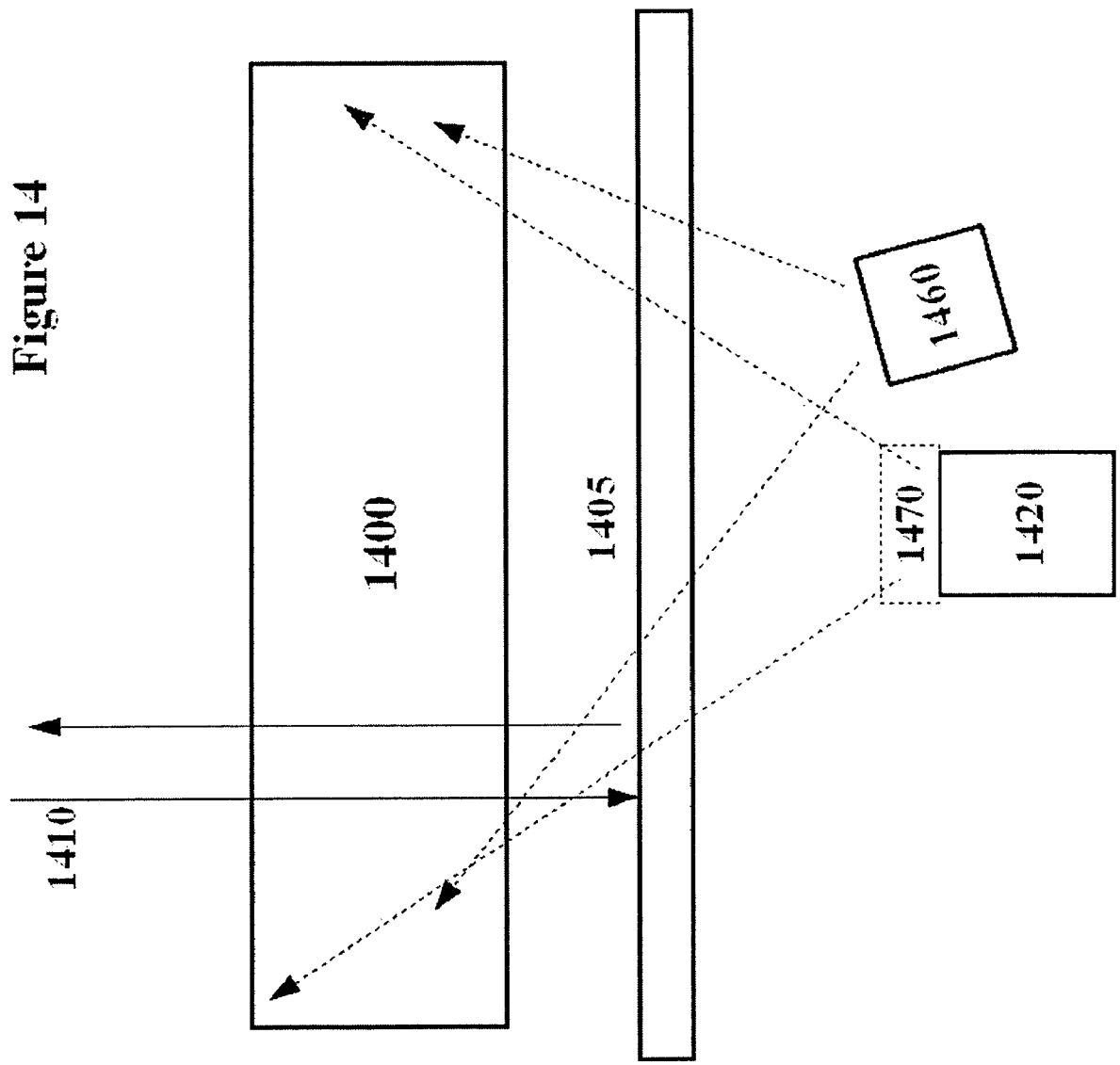

MULTI-FUNCTIONAL CONTROL AND ENTERTAINMENT SYSTEMS

CROSS REFERENCE TO RELATED APPLICATIONS

This application is a Continuation-in-Part of Ser. No. 10/893,534 (Camera Based Man Machine Interfaces), filed on Jul. 19, 2004, which is a continuation of Ser. No. 09/612,225, filed Jul. 7, 2000, now U.S. Pat. No. 6,766,036.

This application is also a Continuation-in-Part of Ser. No. 10/934,762 (Reconfigurable Control Displays for Games, Toys, and other Applications), filed Sep. 7, 2004.

This application is also a Continuation-in-Part of PCT/US2004/09701 (Reconfigurable Vehicle Instrument Panels), filed Mar. 31, 2004.

This application is also a Continuation-in-Part of U.S. Ser. No. 10/611,814 (Reconfigurable Instrument Panels), filed Jul. 2, 2003.

This application is also a Continuation-in-Part of U.S. Ser. No. 09/789,538 (Programmable Tactile Touch Screen Displays and Man-Machine Interfaces for Improved Vehicle Instrumentation and Telemetric), filed Feb. 22, 2001 now U.S. Pat. No. 7,084,859.

This application also claims benefit of US provisional applications; 60/591,213, (Multifunctional Control Systems), filed Jul. 27, 2004; 60/598,446 (Flat Panel Based Control Devices), filed Aug. 4, 2004; and 60/650,554 (Reconfigurable Tactile Control Displays for Automobile Instrument Panels and Other Applications), filed Feb. 8, 2005.

The disclosures of the above-noted U.S. patents and co-pending patent applications are incorporated herein by reference in their entirety. The disclosures of U.S. Pat. Nos. 5,982,352 and 5,372,970, by the inventor, are incorporated in their entirety along with an SAE paper entitled Reconfigurable Tactile Control Displays, co-authored by the inventor, which was presented at the Convergence 2004 Conference in Detroit, Mich. in October, 2004.

FIELD OF THE INVENTION

The invention herein primarily concerns flat panel based control system interfaces which have certain commonality with my "Reconfigurable Tactile Control Display" (RTD) invention described in co-pending references, particularly in the method of sensing knobs (and other physical details) and finger touch indications. The invention is usable for controls such as Instrument Panels and particularly Vehicle Instrument Panels (also called an "IP", and in some cases a dashboard, or dash panel or dash). The invention in one preferred embodiment utilizes controls which are mounted adjacent the display, while another embodiment utilizes machine vision to sense the location of physical details and finger touch by looking through a liquid crystal display from the rear, facilitated by novel LCD backlight designs.

The invention further includes method and apparatus for determining locations of controls and/or persons actuating controls using machine vision, also including desirable vehicular arrangements therefore.

BACKGROUND OF THE INVENTION

For use in vehicles, it is desirable to have multi-functional (also known as reconfigurable) controls in the center stack portion of the instrument panel in order to best provide electronic and telemetric functions to the driver. Typical approaches today utilize touch screens, menu selection via joystick like rotary devices and icon based screens with physical switches around the periphery thereof. All of these approaches have significant disadvantages, and none allows any reconfiguration of classical controls such as knobs and switches most familiar to the vast majority of the motoring public. These problems have recently been described in a SAE paper co-authored by the inventor entitled Reconfigurable Tactile Control Displays, which was presented at the Convergence 2004 Conference in Detroit, Mich. in October 2004.

In my co-pending applications listed above I have described a new form of low cost control system which allows reconfiguration of common control details such as knobs sliders and switches, an approach which avoids the inherently un-natural (at least for many) menu based systems, and provides much more tactile feed back than all of them. I call it a Reconfigurable Tactile Control Display, or RTD.

The RTD is elegantly simple in concept, and in a preferred embodiment utilizes machine vision. However substantial projection display and machine vision R and D work is required to meet cost targets for its intended primary automotive instrument panel application.

There exists therefore a need to provide such reconfiguration capability with at least some of the RTD's advantages such that vehicles and other applications could be equipped in the near term, with minimal r and d required. This application describes a solution which may if desired, utilize conventional flat panel displays and conventional control readout electronics. It also may be used with OLED displays of the future, and the rear projection displays as well, if desired. And in some embodiments it too uses machine vision to determine control positions.

A group of patents and applications by Denny Jaeger, also with Kenneth Twain, describe reconfiguration of control details on flat panel displays, as well as my own U.S. Pat. No. 5,982,352, a division of which Ser. No. 09/435,854 is co-pending at this time. Of these patents the only ones that may practically operate with standard LCD (and therefore inexpensive and affordable) display devices are those having some sort of overlay member placed on the front of the display screen, to which, in the Jaeger et al cases, a base member for the knob is mounted. (see U.S. Pat. No. 5,936,613). In the Jaeger et al disclosure, the base member and/or the knob itself contains electronic readout devices whose information is communicated via wires or other conductors to signal conditioning and analysis equipment elsewhere.

This approach has the disadvantage that the use of an overlay member and the base member makes the knob stick up higher off the screen which can be aesthetically displeasing, and results in parallax and other reading problems of seeing the programmable reconfigurable lettering or other labeling on the screen adjacent the knob, or within the knob if it transparent, or slotted as I have disclosed. An other problem exists if one then wishes to locate a conventional touch screen sensing member (e.g., such as made by 3M company) underneath the knob and in front of the screen, in which case the problem is accentuated, and in the Jaeger et al invention also made more difficult because the base member must then attach to the touch screen. In addition the base member and knob must be of a special design, adding cost.

Jaeger et al have disclosed a system where a knob is located within the confines of the display proper. However, in some applications, such as in a car, when a rectangular LCD flat panel is used as the display, there is a need to maximize the display space available for video or data. Unlike my hitherto disclosed RTD invention, which in preferred embodiments uses a projection display, the LCD flat panel displays become considerably more costly as the display size rises. In addition flat panels become uglier to look at due to their flat nature. Thus it is likely that LCD screens in cars will be limited in size, and thus space on their display area will be at a premium. The large flat glass front piece of an LCD screen can pose a safety hazard as well.

It should also be pointed out that the Jaeger et al knob disclosure deals only with sensing knob position, and does not allow for using the knob to switch high current devices, for example to provide for direct switching of currents to motors in the vehicle. In addition, and also not contemplated in the prior art, the knob of the instant invention may alternatively be used to mechanically operate certain functions directly, such as opening heat mixing doors or valves or air distribution ports, when manually turned by the operator Relative to the new types of sensing of knobs and position controls as well as touch on the front of led displays through the use of machine vision from the rear and special backlights, there is no known prior art other than the aforementioned Jaeger and Jaeger et al. group to the extent it is germane.

Some of the game aspects of the invention herein are also shown in another application of mine, Publication Number 20020036617, as well as my U.S. Pat. No. 5,982,352. The disclosures of both of these are incorporated by reference in their entirety.

SUMMARY OF THE INVENTION

One way to affordably, and familiarly, provide a large display area for control labels, data, and images, is to programmable reconfigure the physical controls of an Instrument Panel such as the knobs and switches which people are familiar with, including their labels and pictographs. Because physical controls can be functionally reconfigured, their number is proportionately decreased, and bigger knobs and lettering can be used. Instrument panel clutter is vastly reduced, without resorting to time consuming and un familiar menu based systems. And as disclosed in co-pending applications, the invention is also useful for other instrument panel type applications, in the home, musical and film studios, factories and the like.

One desirable solution I have found to the above problems of utilizing LCD Flat panel displays and other displays is to locate the knob and its readout on an adjacent member rather than in front of the screen as Jaeger et al's base member is, while allowing a portion of the knob to overlap the screen in order that the display of data relative to the portion overlapping can be reconfigured in its function, either by displaying different labels next to the knob or behind the knob, if it is transparent. Several examples of the invention are described. All have the advantage that the knob does not stick up excessively, and that standard encoders and/or current switching means can be used. A slider version (analog or discrete position) is also disclosed which obviates the need to use valuable display space for the slider track mechanism . In addition, the knob and slider can have mechanical detents to help the user feel what turning movement he is making. Alternatively, such detents can be programmable generated if desired by motors connected to the actuation device of the knob or slider.

Another solution I have found is to operate a Flat panel LCD display in an entirely different manner, but in a way similar to co-pending applications referenced above which utilize a projection display to enable a new form of control in which a TV camera or other electro-optical sensor senses positions of control details located on the surface of the projection screen or an overlay thereon without requiring electrical transducers to be wired to the face thereof, and optionally senses position of finger touch on the screen or overlay as well. This application further extends this concept to flat panel displays such as LCD displays.

The invention discloses a new method to operate the LCD display, in conjunction with the use of machine vision to see the knobs and other physical details and optionally the finger touch. This machine vision used is in effect the same as employed in my co-pending applications, largely concentrated on projection display based versions. For LCD's which have maximum transmission with no voltage applied on a particular pixel, the method consists of applying zero or sufficiently minimal excitation voltage to the regions of the LCD which represent zones in which datum's such as targets on physical controls are located. This allows maximum transmission of light to these datum's, and maximum light returned to the camera behind the LCD by reflection back through the LCD from the datum. This is true either for use with the main display visible light source, or auxiliary sources for the camera, usually in the near IR. This whole procedure causes no display changes visible to the user, since the datum's are usually not where the person can see them, for example on the back of the knob facing the LCD. This also shadows them from illumination from ambient sources, such as sunlight.

This same technique will work for finding a finger contact in the situation where, as is often the case, we project icons on the screen to be touched, and the touch portion meant for touching contains an area in which the LCD is substantially transmissive (i.e., a suitably small or zero voltage applied in the region of the icon or other place where a possible finger touch is expected.). This is the same effect as noted from the video projector based version disclosed in co-pending applications, when the projection light itself is used as the source. In that case though, if you use an IR source separate from the projector, there is no influence from the image you choose to display. In short, you can project dark, but still see the touch as the separate source has been used. However, in the instant case, the LCD system does influence the passage of light from for example, an optional IR source in the rear, which must also pass thru the LCD system. Thus in this case, it is not very feasible where the finger touch can be anywhere, and images have to contain darks as well as lights in random locations.

The invention also discloses novel physical control details usable with projector-based systems as well (and in some cases, preferable therewith). These concern controls, which are constrained, typically at one end, or both ends. Torsion (knob like) and bending (switch like) are used to move the control object, which results in an object that returns to the original physical position if elastic and little hysteresis. The ability of the invention to programmable change such controls, and to deal with their calibration (for example, via look up tables correlating movement or control variable change to image change) and to set the control system zero at arbitrary non-mechanical zero positions of the physical control is very interesting and useful. Indeed, the invention, because of its programmable labeling, enables a new more tactile control paradigm in this regard, as it becomes possible to turn knobs, or move other linear devices in a manner that the user always moves them from what he knows is the zero value, rather than the last value, which he might have forgotten (common place in some car controls for example). This means you don't have to glance at the label to see what value its at (though you can, thanks to the invention), you just turn it what you think the right amount is, from your tactile understanding of that control element. based on past usage. This is much different than vehicle hand controls today, as it returns to zero even though the controlled value remains at the last setting before you let go. This is a very tactile method.

The invention also discloses a method for making common items such as trim pieces into control devices, and further discloses advantageous arrangements for vehicle instrument panel application.

In addition where cost is a concern an improved projection method for dealing with a limited number of choices of control panel configuration (e.g. a Instrument Panel center stack with a "heater" or "radio" section projected sequentially) is disclosed, wherein a simple scanning device is used to provide labeling and other graphics on a fixed type of projected image (which may be changed using a change mechanism if desired, but remains a fixed image during the programmable display writing process). This scanning device, generally employing a red diode laser, can be used to sense finger touch or control detail position as well has been disclosed in co pending applications.

An improvement to my co-pending applications entitled "Camera Based Man Machine Interfaces" is disclosed for controls within a vehicle, particularly for use by passengers therein, rather than the Driver who is the primary focus of the RTD. Not only are physical controls are moved by a user disclosed, but also those where the user can block or expose reflectors on portions of the vehicle or objects within to light with their fingers or other body parts to actuate the control. In some cases the body part is used directly to make the control function occur, such as raising the volume of a rear seat entertainment system. The control details such as knobs or the reflectors utilized for these functions are typically, but not necessarily, located on seats or door panels of the vehicle such that they can be seen by cameras mounted in the headliner or pillars.

The availability of dependable and low costs camera systems in the vehicle for human interface purposes leads as well to disclosed embodiments herein for games and other entertainment which can be played on trips or the like

BRIEF DESCRIPTION OF THE DRAWINGS

FIGS. 1a and 1b illustrate a basic knob based embodiment of the invention located in this example, in the "center stack" of a vehicle instrument panel;

FIGS. 4a and 4b further illustrate reconfigurable labeling of a knob, in this case one with a transparent outer disc on which data can be seen if desired;

FIGS. 11(a)-11(c) illustrate several aspects of a machine vision sensed LCD embodiment of the invention;

FIG. 14 illustrates operation of the invention in a reflective, or transreflective LCD system;

DESCRIPTION OF THE PREFERRED EMBODIMENTS

FIG. 1a is a front view of a basic embodiment of the invention, located in the "center stack", 100, of a vehicle instrument panel. A typical center stack is approximately 10 inches wide and 14 inches high, though dimensions may vary from top to bottom (where the center console or transmission hump is), and other cars or trucks may have different dimensions. As shown the air vents commonly found at the top of the center stack have been moved to the middle, to allow for putting the most display area as close to the drivers line of sight as possible. The display in FIG. 1 is blank, with the system turned off. Examples of it "on" for different selected functions on are given below.

Two knobs having reconfigurable functions, 105 and 110 overlap a standard flat panel display 115, (in this case a large LCD type having a width of 9.3 inches and a height of 6.2 inches, with a diagonal measurement of 11 inches—double the area of the 8 inch screens which are the maximum used today).

Figure 1B:
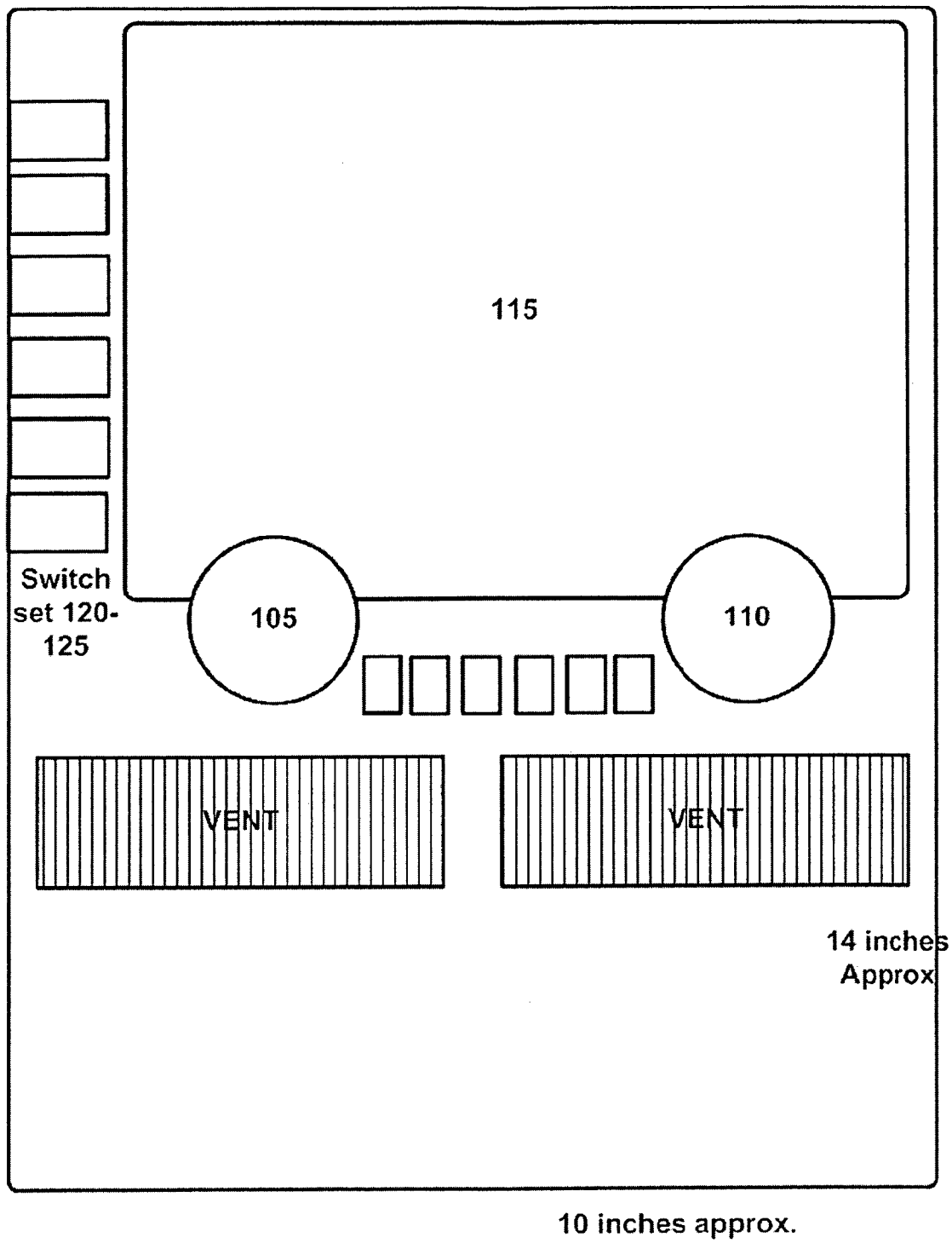
Figure 10:
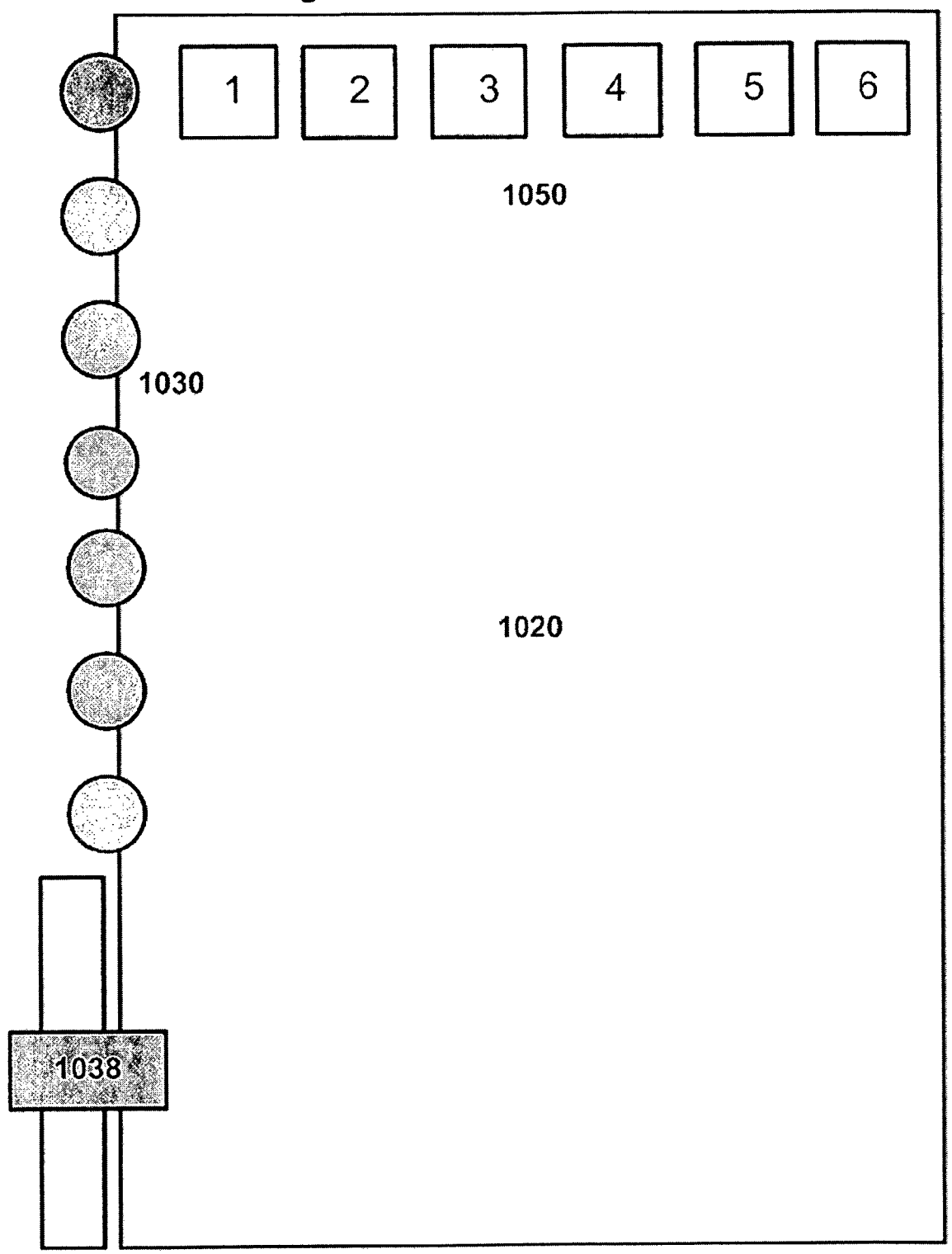
FIG. 10 illustrates use of the invention for audio mixing consoles.

The function of the knobs is selected in this instance using a set of standard switches 120-125 located below the display. Such a switch set (in whole or in part) can alternatively or in addition be placed on the steering wheel or elsewhere on the instrument panel. Additional knobs such as 130 and 131, or switches or sliders can also be located near the display, as will be disclosed further below. A set of radio preset buttons 140 is also shown. These can be physical as shown, or can be labeled on the display, if the buttons are moved up adjacent to the display to achieve close correspondence between the button and the label. If the display has a touch screen function as shown in FIG. 10, these buttons can alternatively be provided as virtual icons 145 (dotted lines) on the display itself, for example.

Where one employs alternative methods of switching functions, the switches 120-125 can be eliminated and the vents moved up. For example, FIG. 1b illustrates function switches along the left side of the display instead of below it. This has an added advantage that if desired the functions could be programmable changeable using icons on the display for example, while still meeting FMVSS 101 rules that the label should be on or adjacent the control. Another alternative version could have a selector knob to switch functions.

Figure 2:
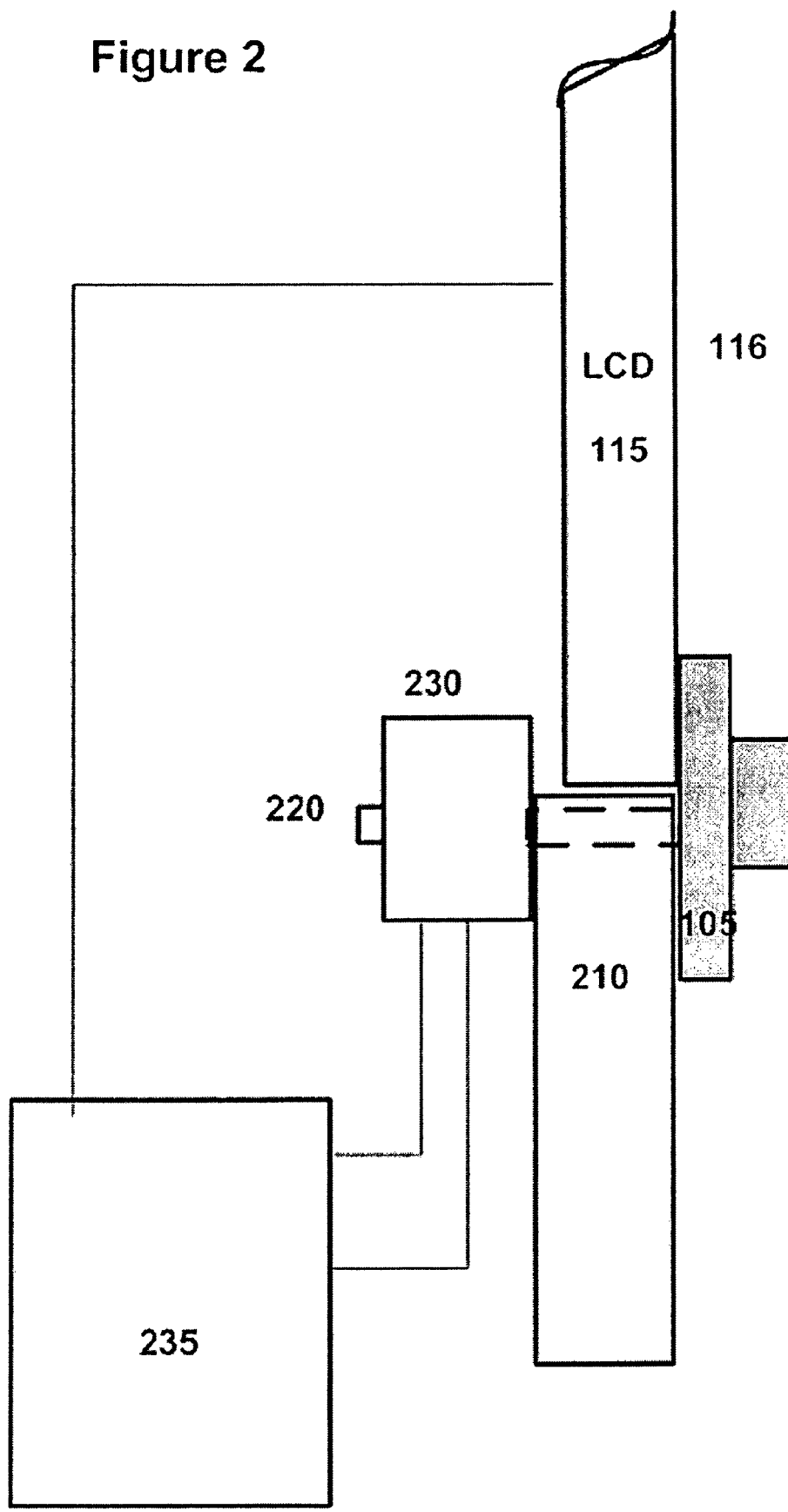
FIGS. 2a and 2b illustrate one of the knobs of FIG. 1, illustrating its angular position readout by a standard rotary encoder or potentiometer, and further illustrating the attachment of the knob to a member, such as an instrument panel, to which the flat panel display is also typically attached.
Figure 2:
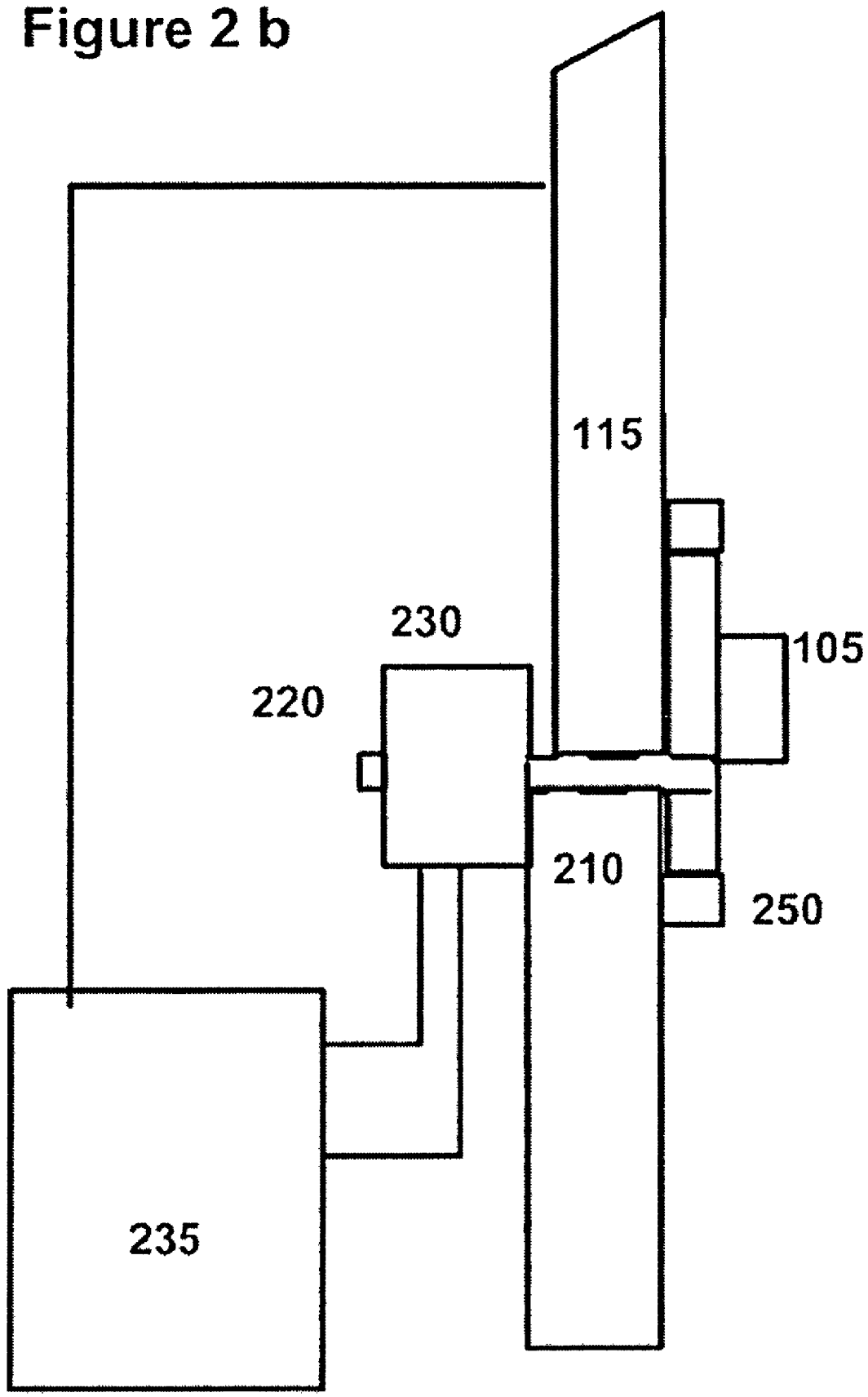

FIG. 2 is a side view of one of the knobs of FIG. 1. FIG. 2A illustrates the attachment of the knob 105 to a member, such as an instrument panel 210, to which the flat panel display 115 is also typically attached readable by passengers in the passenger compartment of the vehicle 116.

As shown the knob shaft 220 rotates in a journal bearing pressed into the instrument panel, for example, and secured appropriately by known means in the art (not shown for clarity). The bearing and shaft maybe detente by known mechanical means if desired, either to indicate to the driver that a certain variable value given by angular displacement of the knob has been made (e.g. a detent every 10 degrees say), or that the state has been switched to a new function.

The knob rotary position is determined by a knob angular position-sensing device (for example, a rotary encoder or potentiometer such as 230) coupled in one instance to the knob shaft, and fixed relative to the instrument panel in its case so that the knob turns the encoder with respect to its case. When the display and controls are switched to allow inputs from the driver or other operator relating to a second function, computer 235 (including data acquisition, graphics and control) first reads the data from the knob position measuring device, stores in memory the last position value for the first function so that it may be recalled when the knob once again represents the same function.

Figure 6:
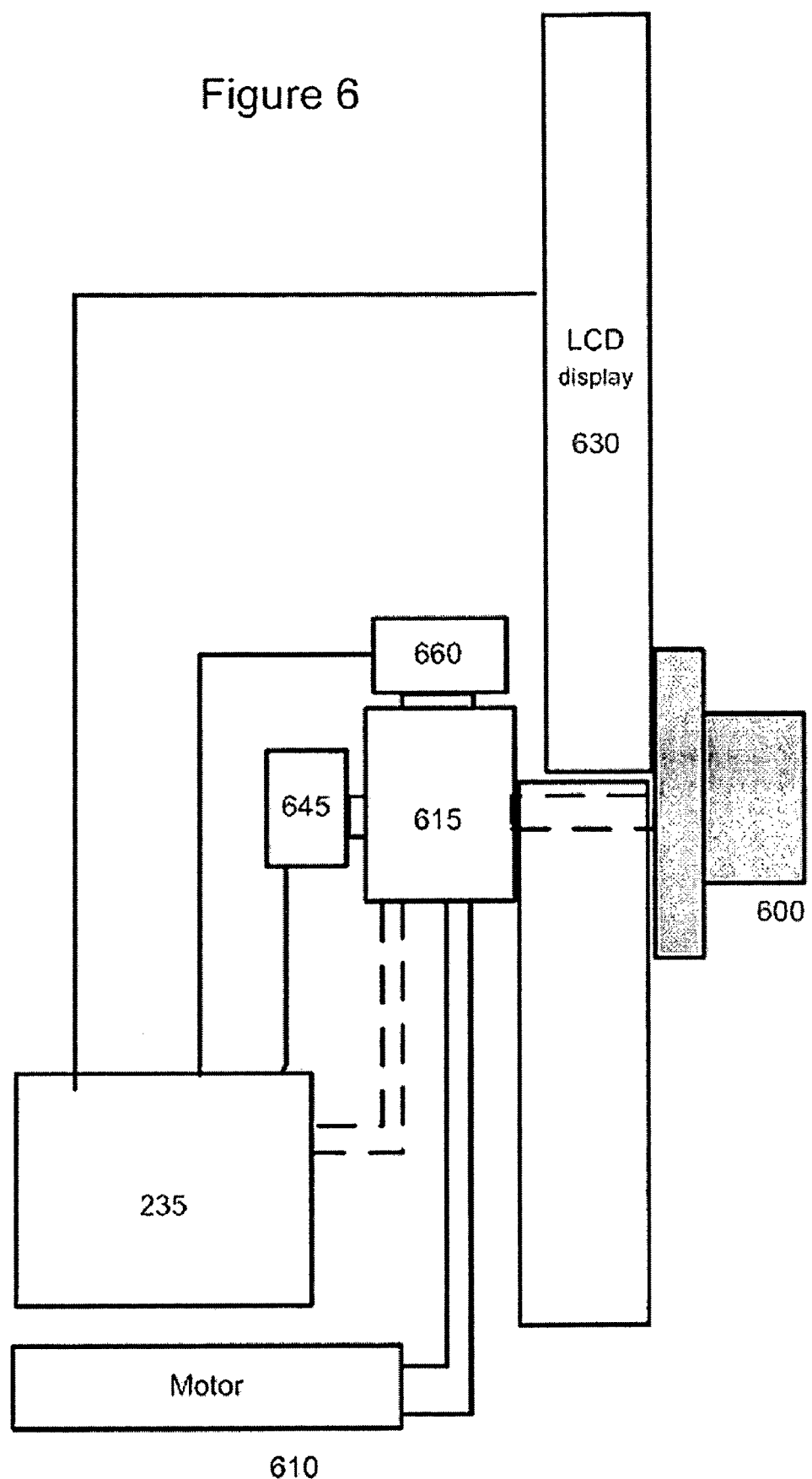
FIG. 6 illustrates a knob used to directly control a heater fan motor, to control the speed thereof. Optional vibration feedback or force feedback devices are also illustrated.

Computer 235 has output means to provide control signals from the data read to the appropriate actuator, for example to control the speed of the fan motor of FIG. 6.

FIG. 2b illustrates an alternative mounting means whereby a knob is held by, and rotates within, an outer race 250, which is attached to the instrument panel over an arc shaped portion of the outer race surface. This allows one to mount the center of the knob in front of the display, if desired, but requires a connection to a sensing device behind the panel that is off the axis of the knob. We note however that the raceway itself can incorporate angular sensing devices whose wiring can easily be routed through the zone attached to the instrument panel.

Figure 3:
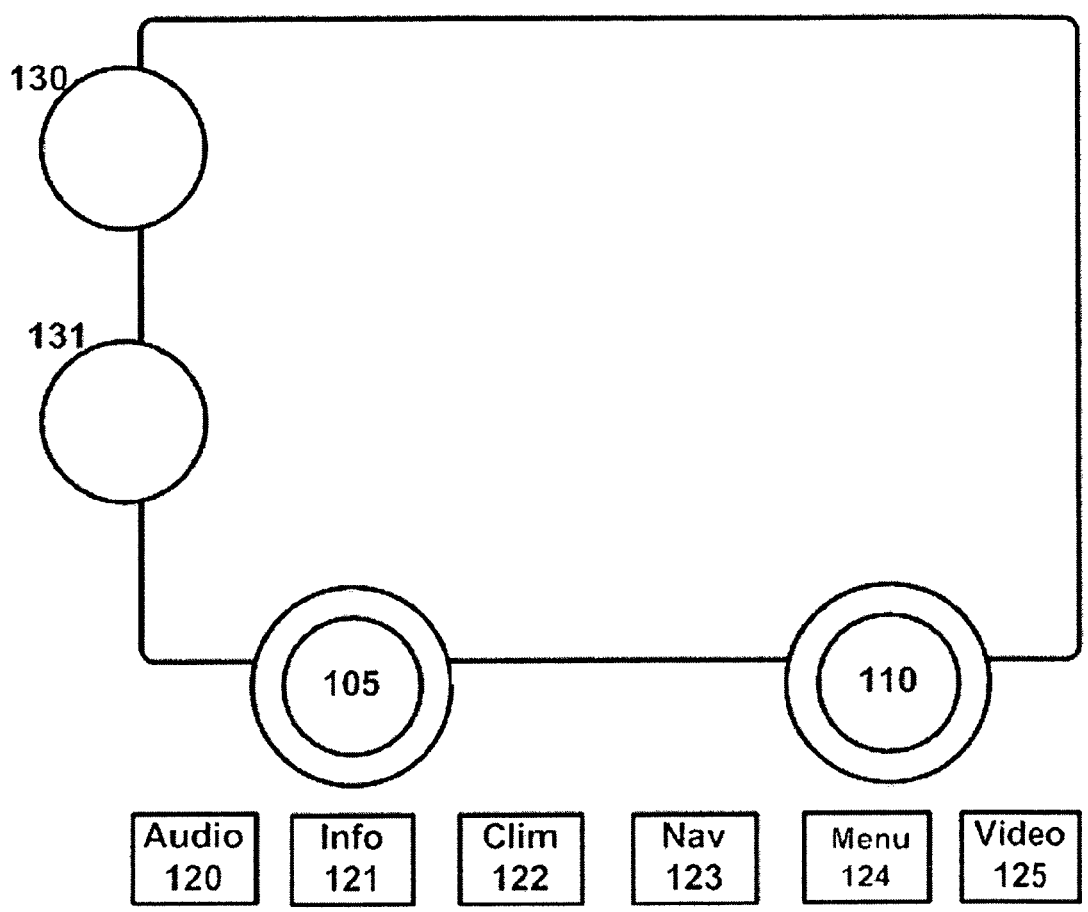
FIG. 3 illustrates the use of the invention to reconfigure the control functions between two (of the many possible) choices.

FIG. 3 further illustrates the use of the invention to reconfigure the controls between functions—AUDIO, CLIMATE, NAVIGATION (maps), etc which are activated, for example by the function switches 120-125 with, for example, imprinted labels arrayed horizontally below the display. While only two selected functions (audio, climate) are shown in the examples of FIGS. 3a and 3b, it is clear that a larger number of different functions can be selected, limited only by the label size and the available space on either the instrument panel, or the display depending on which type of function selection device is used.

FIG. 3 illustrates an example wherein the AUDIO function is selected (switch 120) which once selection is made, shows the labels and controls of a radio and other audio components. The whole is an up to date representation of the classical radio layout familiar to all. The computer (such as 235) controls the function and display on the LCD of data concerning the function. In this case knob 105 represents volume of the audio system, and knob 110 represents a tuner knob, and their inputs are read by the computer and used to control these functions accordingly. If the CLIMATE function selected the data input from the two knobs is for example, temperature and fan speed. The former is a continuous span while the later has discrete positions.

However, there are more functions required than just the two knobs represent for both audio and climate. These added functions can be provided also in reconfigurable fashion by use of added virtual controls (such as usable with a touch screen as shown below) or physical controls such as switches. Alternatively, or in addition, one can employ one or both of the two additional reconfigurable knobs 130 and 131 on for example shown on the left side of the display 115. These knobs can be used programmable for a variety of functions. In one example, they are employed to operate added audio functions, since the audio mode has been selected. In this example, knob 130 is used to control balance side to side, while 131 is used for fade front to rear. When these seldom-adjusted functions have been registered, the display of the information can be eliminated when needed, for added display space if desired. Alternatively, they can be reduced in intensity, or eliminated, to reappear at full intensity for example, if the audio selector is pushed.

When another function is selected, such as CLIMATE, the control and labeling provided by these knobs is generally changed as well. In this instance, one of the small knobs 131 or 132 may become the temperature desired, while one of the main knobs 105 or 110 controls distribution of air to 5 discrete locations. The second small knob can control miscellaneous other functions such as rear defrost.

In my opinion it is simpler and less distracting for the average person to turn a knob to a given temperature, than to press down on a time based key and wait until some value is reached. Such time based keys are commonly used in vehicles today rather than sliders or knobs, because no invention like mine has been offered which could practically reconfigure the knobs or sliders such that such standard and familiar controls could to fit the available center stack space FIG. 4 illustrates several examples of a knob and its reconfigurable labeling on the display. For example consider FIG. 4a. Only one knob 400 is shown, in this example having a "Hat" comprised of a grasping portion 405 and a disc portion 406 (the hat brim), which can be a fully or partially transparent disc, or opaque. In FIG. 4a the knob is set to high fan speed of a climate control module. Note that the pointer (a dot 420 in the case shown) is programmable. The pointer can be outside the knob, or in the case of a transparent hat brim 406, it can alternatively be located in the transparent brim portion. One can alternatively or in addition indicate selection by just illuminating or accentuating the selected function (the word High in the 2 O'clock position in FIG. 4a for example has been put in italics and made larger to show that it has been selected. Its color could also change).

Figure 4B:
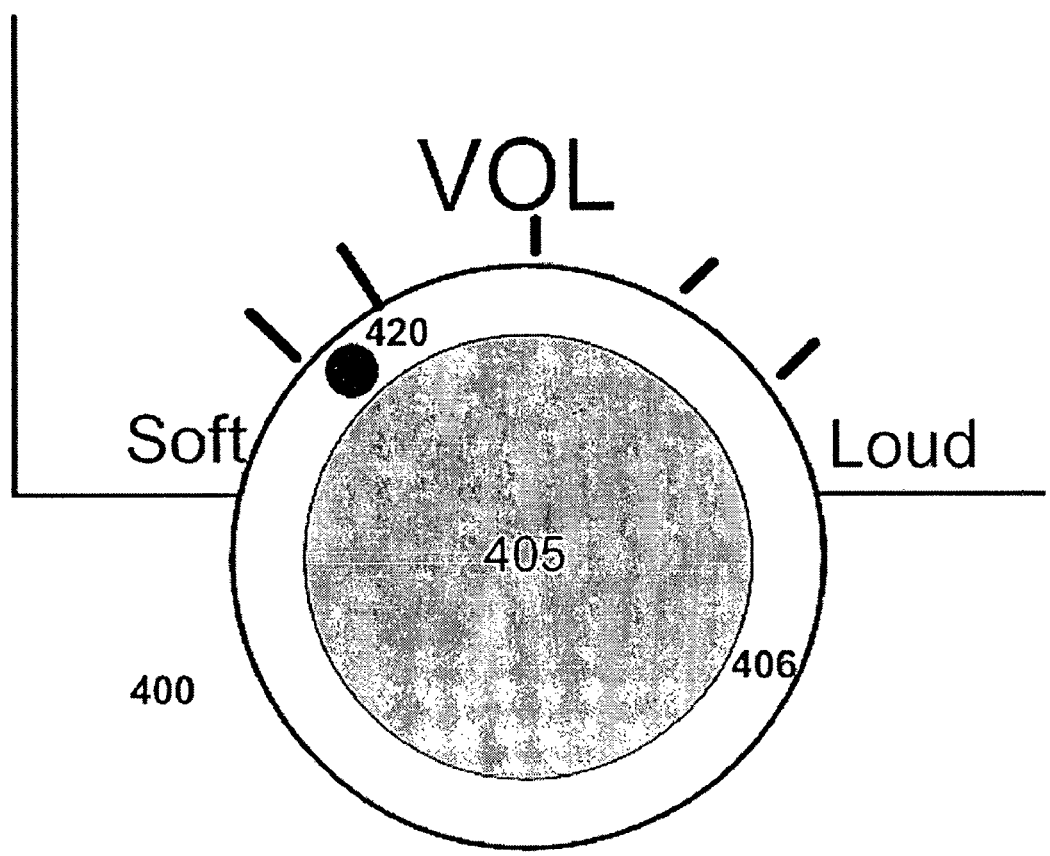

This programmability allows the knob, with no physical rotation, to indicate for example a value in the 10 O'clock position, when the function is changed from climate control to audio for example, such as shown in FIG. 4b This illustrates radio volume, which as continuum of possible settings from soft to loud. In this case gradation marks are for example displayed to guide the user. The variable such as fan speed represented by the knob may alternatively be displayed behind in the transparent brim. A function selector knob can be provided alternatively to the selection switches shown in FIG. 1.

Figure 5:
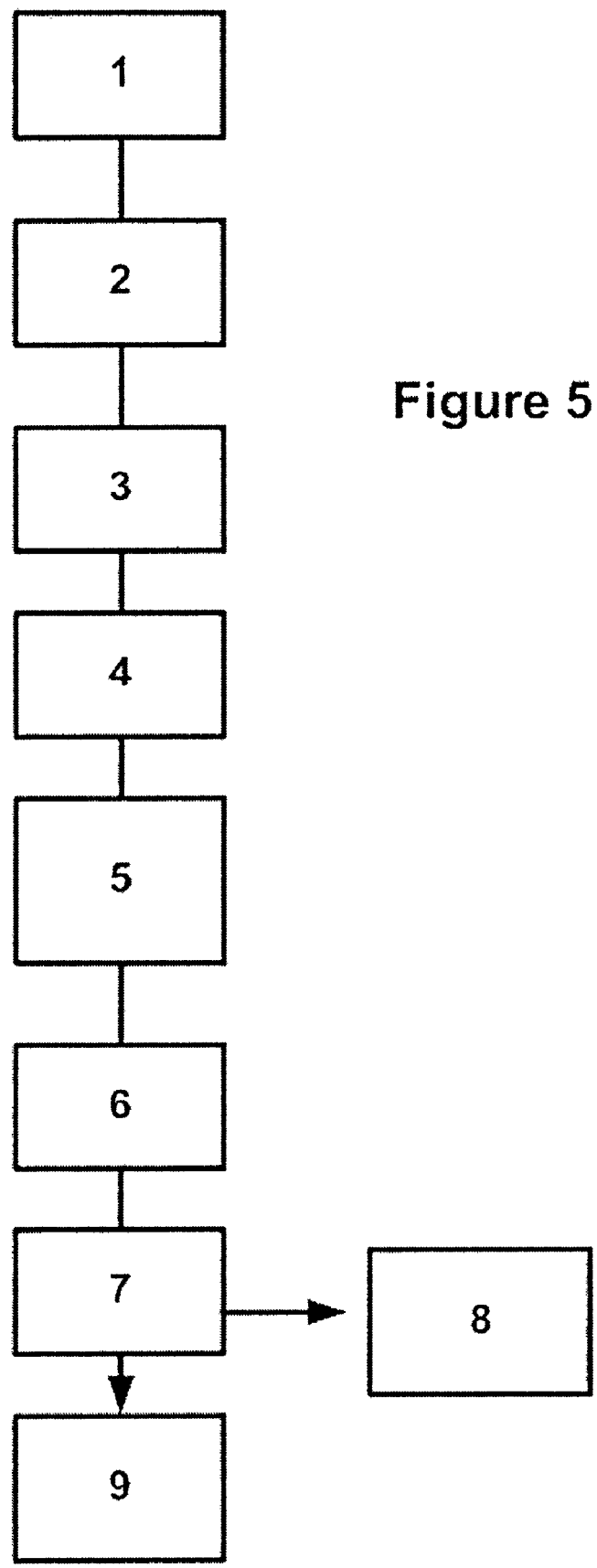
FIG. 5 is a block diagram illustrating control of functions using said knob.

FIG. 5 is a block diagram illustrating control of functions. For example consider the following steps:

1. Select function desired using touch screen icon, selector knob, selector button, or other.

2. Display graphics and text for that function (E.g. radio tuner, station letters on presets, vol and tune on knobs). Minimize or eliminate graphics for other functions which would detract from legibility of selected function.

3. Sense operator command made by turning a knob, or pushing a touch function (or other function such as moving a slider or pressing a physical switch for example).

4. Display a new setting, for example if a knob display knob pointer (on the knob, or on a tuner for example) at the new value, and if desired, accentuate the label for that value.

5. Send command to device (e.g. radio amplifier or tuner section) indicative of new value.

6. If a digital presentation is desired, cause the display to display the value digitally.

7. Select a further value of the function selected using a different input, e.g. change the volume as well as the station.

8. After a certain time, cause the display to revert to default setting, if desired, while continuing to hold the selected values.

9. Wait for next command.

FIG. 6 illustrates a knob 600 used to directly control a heater fan motor 610, to regulate the speed thereof. In this case, turning the knob to a discrete contact position makes a set of contacts in the rotary switch 615 for that position which convey the current from the electrical source to the correct motor input. Optionally the contact closure of this position can also be provided to control computer 235 to allow it to display related data on the LCD screen 630.

FIG. 6 also illustrates the addition of a computer controlled force feedback motor 645 to the knob of FIGS. 1 and 2, to provide a programmable detent function or other feedback to the operator of their state or value. Such a device and detent function is described in numerous patents and applications assigned to Immersion Corporation. For example, one can program 3 detents if there only 3 values to select in one mode, such as distinguishing between radio, tape and CD on a audio system, versus 5 detents on the knob if there were 5 for a given function, such as climate air vent settings). Otherwise with fixed detents one has to look at the screen, or listen for the result of making the control move (e.g. a blower fan going one speed faster).

Through judicious choice of knob functions, one can generally obviate the use of the programmable detents, for example by having like functions utilize the same knob. An example is stepping through choices on one knob, versus continuous variables on another (which has either light incremental detents, or no detents).

A computer controlled feedback device 660 such as a vibrator motor used in pagers or cell phones can be used in place of or in addition to the feedback motor shown above to signal other information to the person turning the knob. In the case where the knob represents magnitude of a continuously variable function, such as radio volume, the vibration felt thru the knob by the operator can be programmed in computer 235 to change in frequency or amplitude as one turned the knob to a higher volume setting, for example. The use of programmable functions allows one to use the knob there fore for both analog continuous functions such as volume or temperature, versus discrete functions such as selection of different items.

Figure 7:
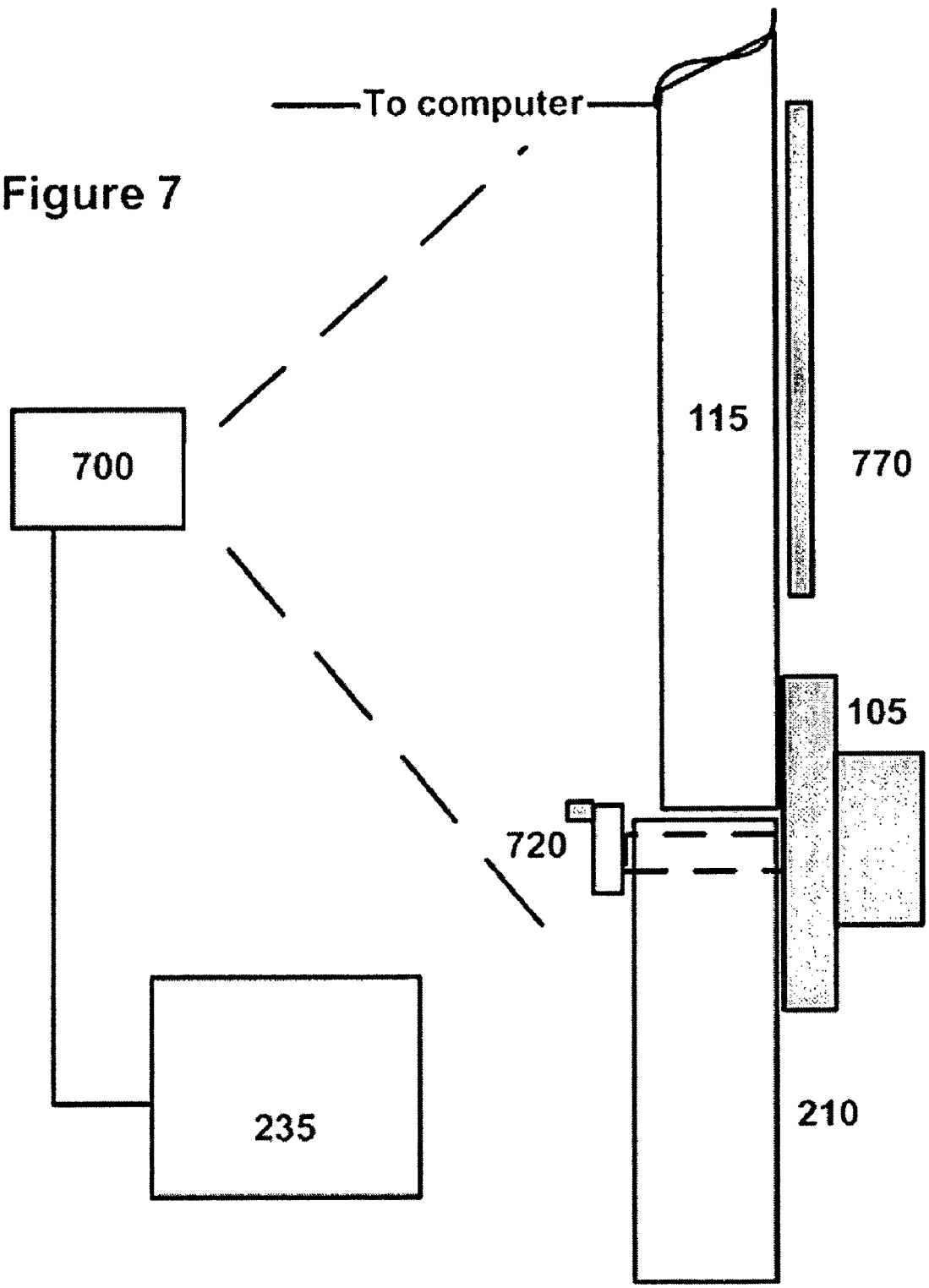
FIG. 7 illustrates sensing of multiple knob slider and switch functions by a TV camera.

FIG. 7 illustrates sensing of substantially all knob slider and switch functions by an electro-optical sensor such as TV camera 700 located behind the display 115, similar to the arrangement in the co-pending applications incorporated by reference. Knob rotational position is determined by using image processing software in computer 235 to analyze the TV camera output for example to find the rotational position of a datum 720 which is connected to the knob shaft on the back side of the instrument panel and rotates with the knob. Position of other physical control details such as switches, sliders, dials and the like can also be determined using the camera as disclosed in co-pending applications. These devices can be located around the periphery of the display like knob 105, or even in other areas below the display, as long as camera field of view is large enough at the resolution required. The more things sensed by a single camera the more economical this solution is. The TV camera typically has a field of view to allow it to view all knobs sliders switches and other control details desired.

It should be noted that the camera may be used sense in multiple degrees of freedom. This allows construction of simple multi-axis knob controls as taught in co-pending references. For example if knob 105 was constructed this way, it could be useful for navigation screens, menu selection, seat and mirror adjustment, as well as its normal rotary only functions.

FIG. 7 also illustrates incorporation of a touch screen 770 covering the whole surface of display 115, or a portion thereof as shown. This touch screen may also be used to perform some of the functions of the physical controls, or completely different functions using programmable displayed icons or other control cues. For example the selector switches of FIG. 1 can be replaced by touch icons on the touch screen, thereby freeing up more center stack space.

Figure 8:
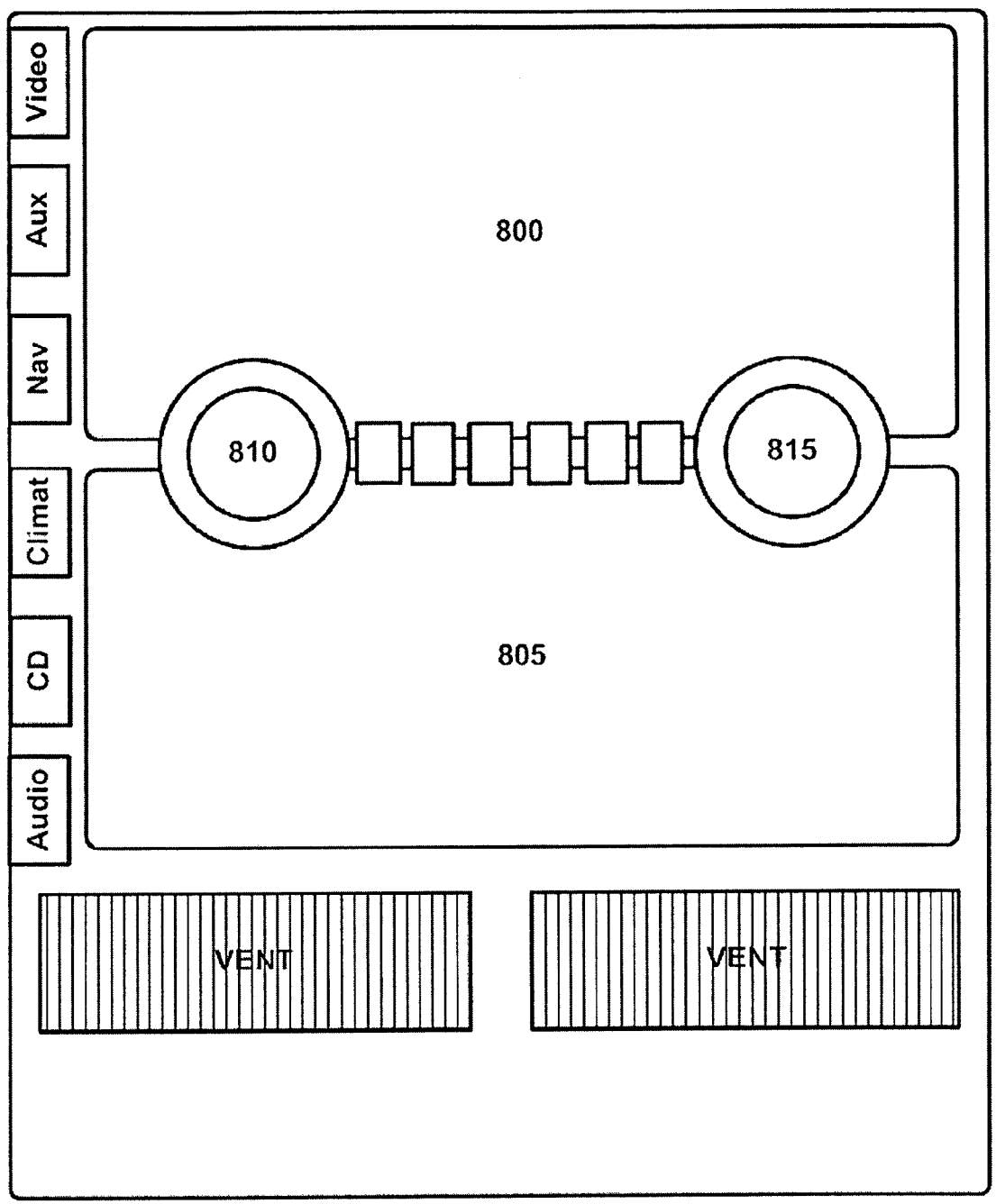
FIG. 8 illustrates an over-under dual display system in which the knobs or other physical details can operate using either screen.

FIG. 8 illustrates an over under dual display system having two displays 800 and 805 in which the knobs 810 and 815 or other physical details can operate using either screen. Also illustrated is the provision of switches to change functions located on the left side of the screens near the driver of a vehicle. One or both of the displays may have a touch screen overlay, to enable touch functions to be sensed.

Figure 9:
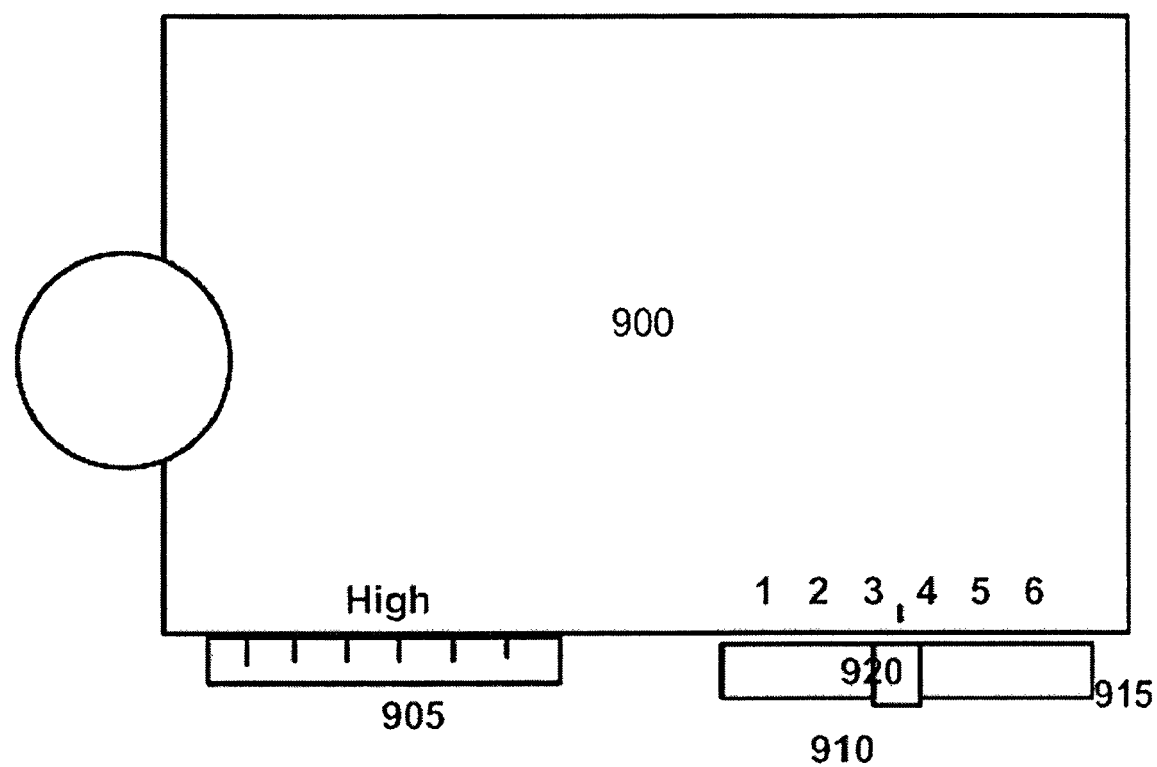
FIG. 9 illustrates dial and slider controls of the invention.

FIG. 9 illustrates other types of controls. For example a dial control 905 and a slider control 910 according to the invention. The dial axis of rotation is vertical in the plane of the drawing, with the axis located behind the display 900. The track 915 in which the slider moves is mounted to the instrument panel and the slider handle 920 is moved by the driver along it in continuous or stepped (detente) motion, as desired. The handle can physically point to a value displayed on the screen 900 or the value can be indicated by a displayed pointer such as the black line 940. The latter, like the programmable dot of the knob of FIG. 3, can be reset to a previous position, when the function is changed.

FIG. 10 illustrates an audio mixing device for recording studios according to the invention herein. A large touch screen equipped LCD display 1020 is used, with a set of knobs 1030 on the left side. These represent the typical knobs used per channel of such mixers, which can have over 100 such channels in large installations. Also shown is a slider 1038 (called a fader in the mixing trade) according to the invention. If desired a second set of knobs and a fader representing a second channel can be on the other side of the display.

It is also noted that knobs of the invention (including those shown in co pending applications) can, if desired, rotate more than 360 degrees. If the camera can read fast enough relative to the angular rate of knob turning, as it generally can, then one can track revolutions using the computer. This allows one small knob to have high resolution, since it might have 10 turns from 0 to full value that the variable represented.

In between the two sides, are touch icons and other symbols can be displayed which can be used to control various inputs and outputs, and the operations done on them.

In the example herein, a set 1050 of 6 touch icons representing 6 channels (for example) of input sound is arrayed across the touch screen 1025. When you touch the icon desired, the computer (not shown for clarity) senses this and enables adjustment of that channel with the knob set 1030 and fader 1038. It is also possible to have many more arrangements this way. With individual icons for each of the 8 knob positions, and to provide graphical methods of interaction on the touch screen as well.

The rear projection based RTD embodiment s described in co-pending applications are also able to use knob mounting and sensing concepts above, which do not get in the way of the projected data. The display used with this invention does not have to be an LCD display, nor does it have to be flat. For example, a curved or flat OLED display can be used.

While stressed herein for vehicle application, the invention may also be used in other applications—anywhere the advantages of large display area and familiar, simple to operate controls are desired. This can be in the home, in factories, or the like.

In the operation of the device having a knob directly controlling a set of discrete switch closures at different rotational positions (as is the case in low cost vehicles, rather than using the computer to do so based on position signals from the knob as in automatic climate control devices), it is difficult to have a reconfigurable setting unless one can disengage the knob from the switch (or provide a second knob). The reason for this is that when one goes to the new knob function, one wishes to leave the switch closure at the same position.

For example, consider that at the first position, the knob was used to switch fan speed in the climate control function. When the function is selected to be AUDIO, this knob would for example become the Tuner knob, say. But the audio system is all electronic, and the only thing needed is to sense knob position. In this case when one selects audio, one also presses in on the knob, which acts to decouple the shaft from the contacts, which stay made at the position they were left at, say fan speed 3. The knob, which can now rotate freely over more than 360 degrees is sensed for position, and thus tunes the radio, via computer 235, without disturbing the contact location for the fan motor. The programmable positional pointer of the knob points at the correct radio tuner position.

When one wishes to set the fan speed again, the knob is pulled out, engaging the contact ring, and the pointer for the knob is programmable positioned next to fan speed 3 (or some other indication of the previous fan speed is provided, such as bold letters on the 3, say). Then as the knob is turned, the contact can move to a new fan speed location.

It is also possible to alternatively use an inside knob and an outside knob concentric with the inside one. Turning the inside one works functions, which are electronic, where as the outside one is for switching fan motor current. (or other power if a added switch is provided).

As an alternative to controlling a function powered by an electric motor for example by making switch contacts or through a computer to relay closures or the like, the knob or slider may be used to manually actuate a function using a flex cable or other means to transmit the mechanical motion, for example to open and shut a heat mixing door to control temperature, as one turns the knob.

My co-pending applications referenced above have in preferred embodiments utilized a projection display to enable a new form of control in which a TV camera or other electro-optical sensor senses positions of control details located on the surface of the screen or an overlay thereon, and optionally senses position of finger touch on the screen or overlay as well. The instant invention further extends this concept to flat panel displays such as LCD displays. The invention in this regard primarily consists of a method to operate the LCD display, in conjunction with the use of machine vision to see the knobs and other physical details and optionally the finger touch through the display from the rear. This machine vision used is in effect the same as employed in my co-pending applications, largely concentrated on projection display based versions. For LCD's which have maximum transmission with no voltage applied on a particular pixel, the method consists of applying zero or sufficiently minimal excitation voltage to the regions of the LCD which represent zones in which datum's such as targets on physical controls are located. This allows maximum transmission of light to these datum's, and maximum light returned to the camera behind the LCD by reflection back through the LCD from the datum. This is true either for use with the main display visible light source, or auxiliary sources for the camera, usually in the near IR. This whole procedure causes no display changes visible to the user, since the datum's are usually not where the person can see them, for example on the back of the knob facing the LCD. This also shadows them from illumination from ambient sources, such as sunlight.

This same technique will work for finding a finger contact in the situation where, as is often the case, we project icons on the screen in the region to be touched, and the touch portion meant for touching contains an area in which the LCD is substantially transmissive (i.e., a suitably small or zero voltage applied in the region of the icon or other place where a possible finger touch is expected.). This is the same effect as noted from the video projector based version disclosed in co-pending applications, when the projection light itself is used as the source. In that case though, if you use an IR source separate from the projector, there is no influence from the image you choose to display. In short, you can project dark, but still see the touch as the separate source has been used. However, in the instant case, the LCD system does influence the passage of light from for example, an optional IR source in the rear, which must also pass thru the LCD system. Thus in this case, it is not very feasible where the finger touch can be anywhere, and images have to contain darks as well as lights in random locations.

FIG. 11 shows the basic invention with a back lighted LCD (Liquid Crystal Display) 1100 with cover plate 1101. The Display, comprises LCD molecules "sandwiched" between two crossed polarizers and TFT drive circuitry to apply voltage to molecules forming individual pixels. But in the instant invention case the backlight normally present and shown in the appendix diagrams is removed, and the backlighting instead is provided in a projection arrangement as now described, and other arrangements as shown in subsequent embodiments.

The "projection backlight" of the invention in one example, operates as follows. Light 1105 from a lamp or other source such as an LED 1110, (preferably with holographic diffuser such as 1111, and also including lens or other optics to form its beam pattern to as uniformly as possible cover the LCD 1100 surface) diverges until it hits an optional fresnel lens 1115 which more or less collimates it to create a light field somewhat similar to the that of a regular LCD backlight as provided in Laptop computers etc today. Clusters of LED's, or other sources can be used and more than one such projector illuminator can be used for a given LCD device 1100. Note that as shown in the figure, light source 1110 is in a different plane, in the direction out of the plane of the drawing, so that it does not get in the way of the camera. Alternatively, it can be mounted to the side, for example.

This light 1105 goes straight thru the system 1100 of polarizers and liquid crystal material when no voltage is applied to untwist the molecules in the LCD, which have rotated the polarization of the first polarizer, so as to pass through the second, crossed to the first. The light hits a feature rotating with the knob 1125 such as reflector 1120 on the back of knob 1125 (in this example, the knob is shown rotating in raceway 1126 glued to cover plate 1101) and passes back thru the LCD device and is imaged by TV camera of the invention 1130, described in many referenced co-pending applications re use of knobs on projection displays screens. Image processing software in a computer 1135 (which can be an ordinary PC) takes the output of camera 1130 and determines the rotational position of the reflector 1120 with respect to a previous location, or fixed locations, in the image field. Thus the knob position resulting from input data from the user is obtained and used to control the LCD display, and any devices connected to the computer. Optionally, it is often desirable to use as separate light source 1131 to illuminate the knob region from the camera side. The knob as shown is at least partly, and generally completely, located on the display region of the LCD.

The point here is to apply zero or sufficiently minimal excitation voltage to the regions 1140, which represent in the case shown an annulus, in which the target 1120 is to be found. In this case the light from either the LCD backlight, or the optional source 1131, or both, always hits the target and is reflected back to the camera.

This same technique will work for finding say finger contact of finger 1155, if we project icons on the screen to be touched, and the touch portion contains an area in which the LCD is substantially transmissive (i.e., a suitably small or zero voltage applied in the region of the icon and where a possible finger touch is expected). This is the same effect as noted from the video projector based version disclosed in co-pending applications, when the projection light itself is used as the source. In that case though, if you use an IR source separate from the projector, there is no influence from the image you choose to display. But in the instant case, the LCD system 100 does influence the passage of light from optional IR source in the rear, which must also pass thru the LCD system. Thus in this case, it is not very feasible where the finger touch can be anywhere, and images have to contain darks as well as lights in random locations.

It is noted that the rotational or lineal position of a knob or other physical detail such as a slider or switch can be determined relative to the camera or other electro-optical area sensing means, without having a local reference on the front of the display, though such can be used if desired. In the later case, a datum, or more likely a plurality of datum's can be used to align the camera to the screen, or a simple single datum next to a knob may be used, for example, to reference that knob (and in a sense, other knobs and features as well at least to a degree, since all are attached to the screen front member).

The knob position on the screen is known a priori by simply placing a search window around the knob, or the portion desired (for example the annulus represented by region 1140 in FIG. 1) in a machine vision program like Sherlock by Coreco Vision, and looking within the window to see where the reflector or other datum is, with respect to some reference, which could be the 12 O'clock position on the camera image for example. A look up table or other method is used to correlate the rotational position so obtained, to the control variable desired, such as 81 degree temperature, or fan speed level 4, or the like. One can also teach the system by turning the knob to the desired rotation, memorizing the image position of the reflector (or pointer, if used) and then making this value, match the desired control function in a lookup table. It is thus possible to even move the knob or other physical detail as desired and enable function of the system. This same technique will work with sliders, switches and even bendable items such as trim, as disclosed below.

Note that the reflector 1120 can be just a shiny part of the knob, or a dull part if the region around it is reflective (i.e. creating the contrast needed for the camera to pick up). It can also be a retro-reflector in this arrangement, in which case the auxiliary light 1135 near the camera lens axis is preferable for maximum light return from the retro-reflector. Physical details such as switches and sliders can also be seen as well as knobs as described in co-pending applications. With a clear plastic knob, the user can also see thru to the display in the middle of the knob.

Also illustrated is another knob version in which the center hub part 1151 is affixed to the glass cover plate of the LCD with adhesive 1153, and the outer portion 1150 revolves around the hub using bearing technology known in the art. If the adhesive is clear, and the center part of the knob (portion 1150 and 1151) is clear, one can, with a clear plastic knob, also see thru to the display in the middle of the knob. In this case the region 1140 where pixels should be light, would be confined to the annular zone where the target(s) are located on portion 1154, such that data could be presented in the other zones, such as that covered by the hub 1151.

Note that by selecting regions of the screen for knob or other physical item location such as opaque or translucent trim piece 1157, one can utilize LCD screens that might otherwise be scrap for the more general purpose of displaying high resolution images across their total area. It is understood that scrap rates (i.e., the part not in yield) for such manufacturing processes may be as high as 40%, and thus any use such as this control function application which can use product that cannot be sold for its intended purposes has a major attraction for cost recovery. Some dead pixels, or underperforming pixels in certain places don't mean much in this application. For example, if the TFT pixel is not capable of generating sufficient voltage in a certain region of the display, this is not detrimental, if in an area such as 1140 where we want it clear anyway (the no voltage case), or where it is simply covered up and never seen, e.g. by a part of a knob or a trim piece.

LCD defects can also reside in the beads of the diffusing material placed in some LCD's on the screen side near the user. In is noted that this material does not substantially disturb the seeing of knobs and fingers given the results I have experimentally found in using a prototype projection based RTD unit (whose screen has similar beads) of my co-pending applications. GE Plastics on their website reports yields of only 75-80% just because of certain diffuser application defects alone. Here again, a diffusion related defect on a normal laptop or TV may not be a defect in a certain application of the invention herein.

Another example of this situation is when the pixel can be seen by the user, but the pixel is underperforming in some aspect, with respect to a pixel accepted by the manufacturer for a high profile application such as HDTV or laptop. This pixel in certain areas of an instrument panel, may be acceptable, even if in view, because of its use to provide a simple labeling function with big letters. For example, the word "HEAT" in big letters may be perfectly readable, and acceptable, even if a few pixels in a letter or nearby are underperforming or dead.

Likely such defects are defined as groups of bad pixels which may be ok within a certain region of a car instrument panel, and not in a HDTV, in which any zone on its face must be capable in general of displaying any image in high quality.

Looking at this in another way, lets say a 15.4-inch diagonal laptop display was placed in the center stack of a vehicle, with the long axis vertical. The part near the top would be used for display surface, and would need to be pretty good, though not as good as a laptop itself. But the bottom part, where control functions are most located could have many more imperfections and still be perfectly usable. Thus the over all region of defect makes a difference too. See also FIG. 6.

Figure 11B:
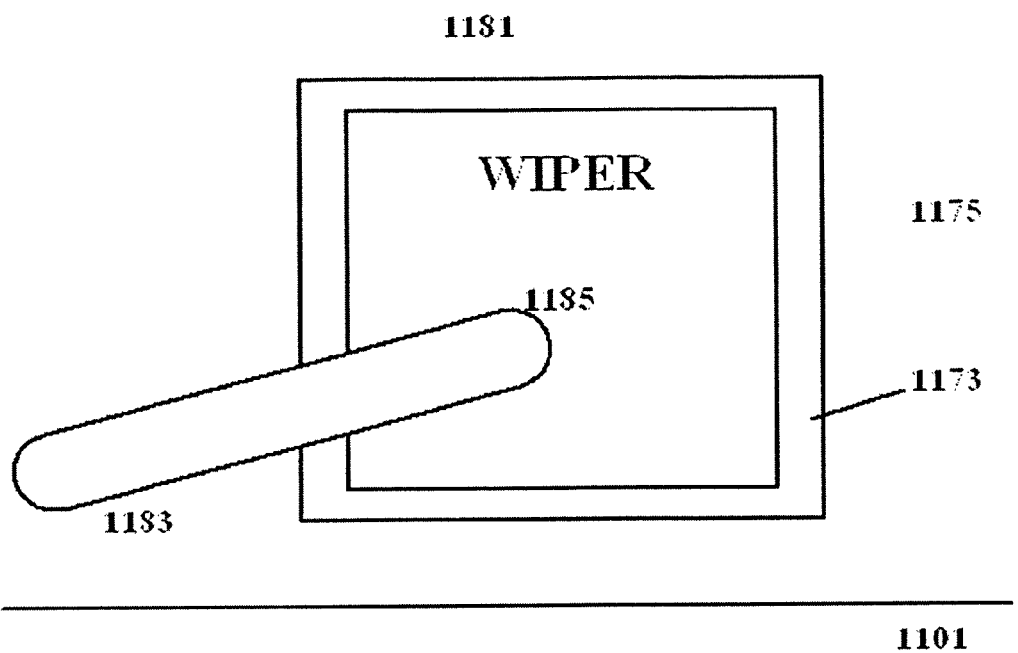

FIG. 11b illustrates a icon 1181 displayed on LCD screen front surface 1101 under control of computer 135. This icon is displayed light colored, or preferably what ever is the no voltage to untwist condition where liquid crystal transmission is highest. The icon has an optional border 1173 displayed which is darker or another color, or both, and serves to separate it from the surrounding display color and data 1175. When touched by finger 1183 in the region 1185, the finger is sensed via reflectance of light from the finger to the camera, and in one example, the icon border 1173 changed color to red. This says that this icon has been touched and not one of the others that might be illuminated simultaneously on the screen. The labeling for the icon can be above it for example. Alternatively, or in addition, it can be in the icon itself, within the border 1173 as in the WIPER label shown. This is intuitive, but has the problem that it is covered up when touched. More of an issue is that display of dark data (the label letters) inside the transmissive light colored illuminated icon, also means that light reflecting back is blocked, and that the light is generally not illuminating at that point either, so a lack of sensitivity exists if the lettering is too big relative to the reflecting area or other machine vision detected characteristic of the finger contact.

Where there is a large amount of ambient light in the region of the user, it is also possible to sense the finger touch by observation of the silhouetted finger image and shape using the camera. This is particularly true if direct sun is on the screen as in a car under certain conditions as disclosed in co-pending applications. The knobs and physical details typically are constructed so that they block such silhouetting light, from specialized targets such as 1120, though clearly their outer shape can be so determined, For example a physical pointer 1187 (optional) protruding from knob 1150 can be so silhouetted by light 1188 coming from the passenger compartment of a vehicle for example, and appropriate machine vision algorithms applied by software in computer 1135 to the data from camera. Note that this method of detection of pointers or other indicating features on the front side (toward user) of physical control details on the screen also applies to the embodiments employing projection displays as disclosed in co-pending references.

FIG. 11a also illustrates a piezoelectric wave generator 1190 like those used in cell phone vibrators to vibrate the surface of the glass cover panel 1101 contacted by the user either by touch or indirectly by manipulation of a physical device such as a knob attached to the panel under control of computer 1135 in order to create signals to the user concerning the state of control functions and the like as discussed in co-pending applications.

Figure 11C:
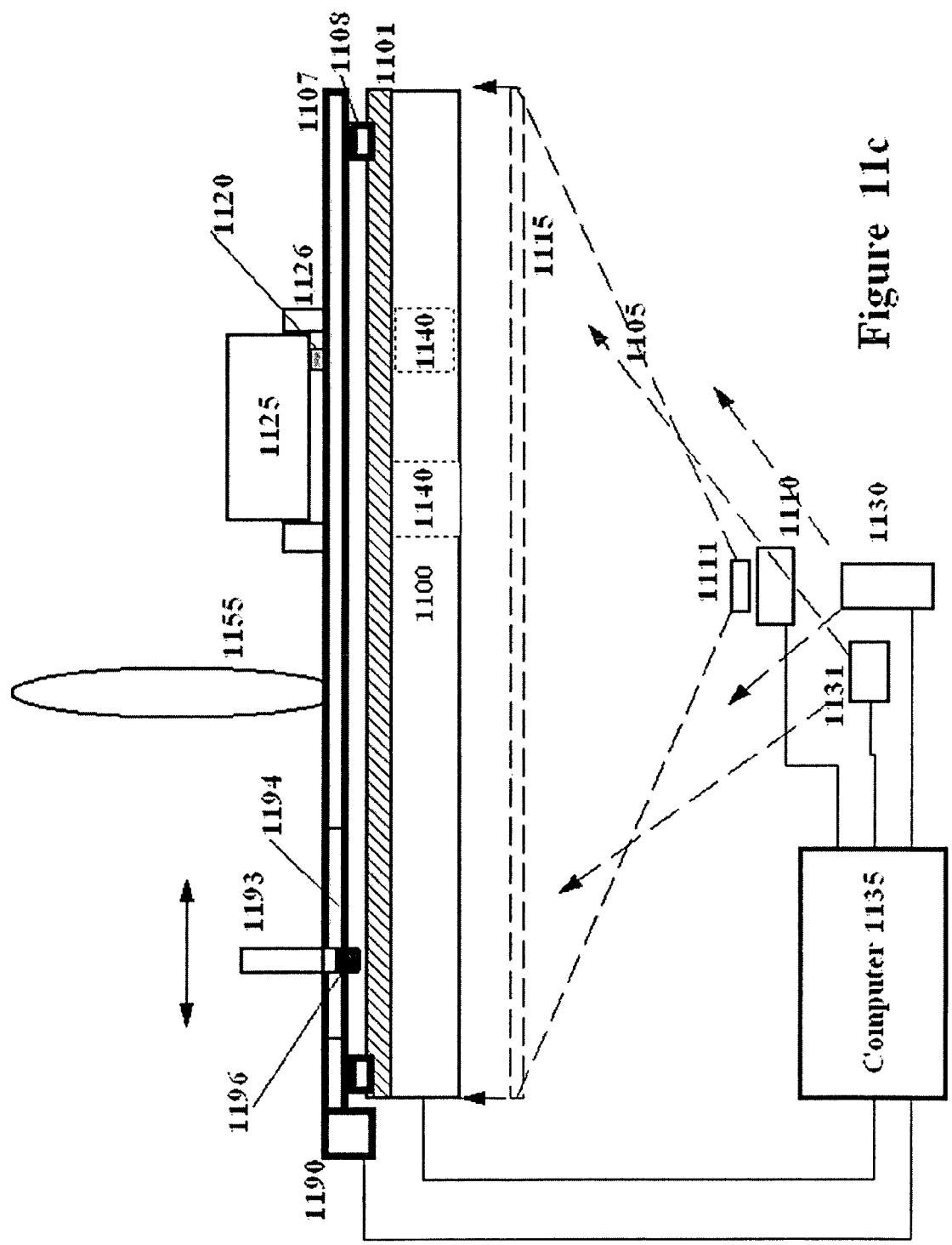

FIG. 11c illustrates the situation where the knob or finger contact is on top of an overlay member to which the knob is attached, such as member 1108 made of clear LEXAN which is in front of the LCD (between the LCD and the knob). The overlay 1108 is generally attached to the front glass 101 of the LCD, noting that such attachment can be either permanent such as with adhesive spacer members 1108, or temporary such as with Velcro instead of adhesive comprising the member 1108. Temporary attachment allows interchangeability of control layouts (with suitable software changes) as is described in detail in co-pending applications.

While typically such an overlay is transparent, (to allow one to see the LCD display beneath), it is not necessarily so. It could be at least in part formed by a piece of plastic trim in a vehicle application for example. For maximum tactile feedback to the user, the computer controlled acoustic wave excitation device, such as vibrator 1190 can be attached as shown directly to the overlay. One use is for the device to signal that a knob position has been reached, such as the next position in a sequence of position. Another is to signal that a touch has been sensed and coordinates reported. Another example (of many) is to feed back to the user a varying frequency of vibration depending the heat value selected by the user.

FIG. 11c also illustrates a slider 1193 able to move in track 1194 in overlay 1108, similar to that shown in my co-pending application '854 referenced above (also U.S. Pat. No. 5,982, 352). In this example the optical detection of slider position is performed by camera 1130 observing reference point 1196 which reflects light from light source 1131 back to the camera. It should be noted, that curved LCD displays if and when they appear commercially, can be used with the invention herein.

Vis a vies projector based RTD systems, the instant invention logically should take up less space, in the depth direction. Though projectors are becoming very wide angle and short throw as it is called, they may use really expensive optics to do it. The invention herein doesn't need that, as the camera optics can be cheap, and the backlight can be lots of possibilities some of which will be disclosed herein. This potential depth advantage may facilitate provision of such devices in the automotive aftermarket, where they need to be fitted into existing designs with minimum cost.

FIG. 12 illustrates alternative backlight arrangements. FIG. 12a illustrates a set of 4 "backlight projectors" 1200-1203 like 1110 in FIG. 11, each covering in this example, a quadrant 1220-1223 of an LCD display. This was referred to in FIG. 11. The camera 1210 in this case is in the middle of the projector set, but one could use a camera with each just like the FIG. 11, or any other desired method of seeing the screen area and the details thereon. One can use more cameras too, if added resolution or other results are desired.

Figure 12A:
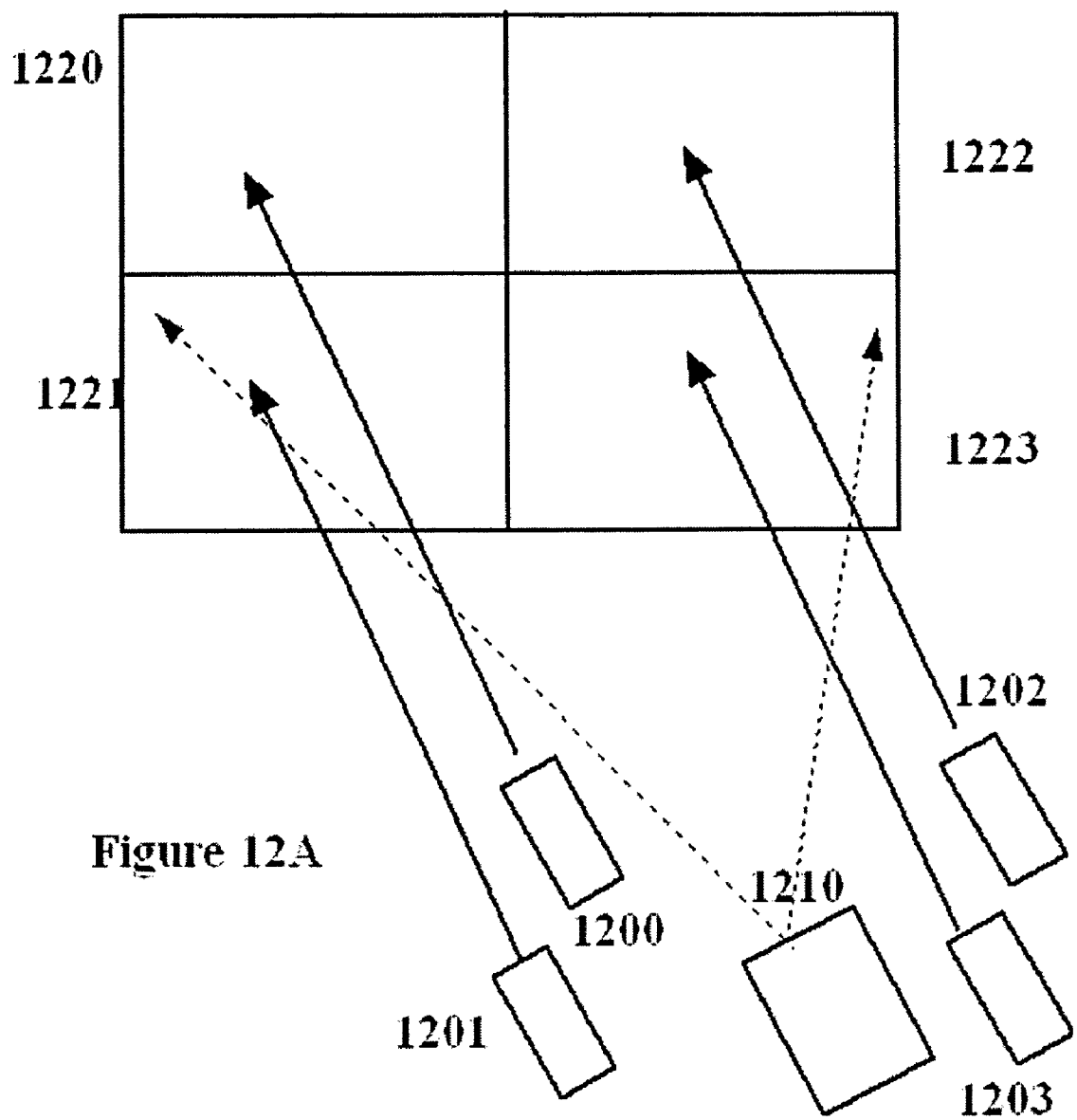
FIGS. 12(a)-12(d) illustrate alternative light source and knob arrangements.
Figure 12B:
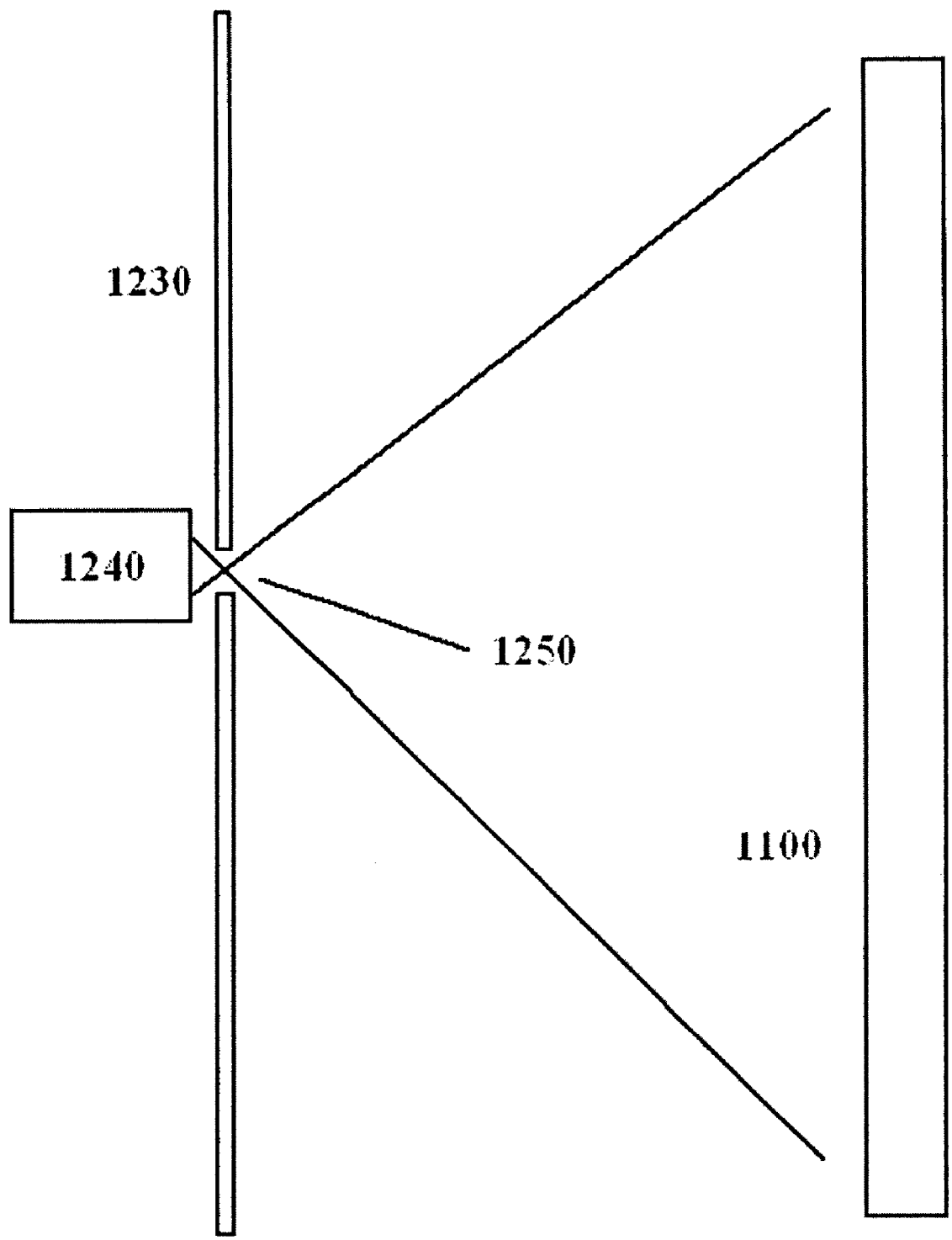

FIG. 12b illustrates a backlight provided by an electroluminescent or fiber optic panel or another backlighting panel of a kind known in the art, 1230, for use in the apparatus of FIG. 11, The panel 1230 preferably of approximately the same extent or larger than the LCD 1100 to be illuminated. The camera unit 1240 observes the knob or other details on the LCD front cover glass 1101 by looking thru a hole 1250 in the panel. This hole can be small in extent such that the light field from panel 1230 is not appreciably disturbed in illumination of the LCD system 1100 (note if it is, it might be desirable to put a trim strip, knob or other thing on the screen in that region, in keeping with the above discussion re defects (which can also be defects in backlighting).

Figure 12C:
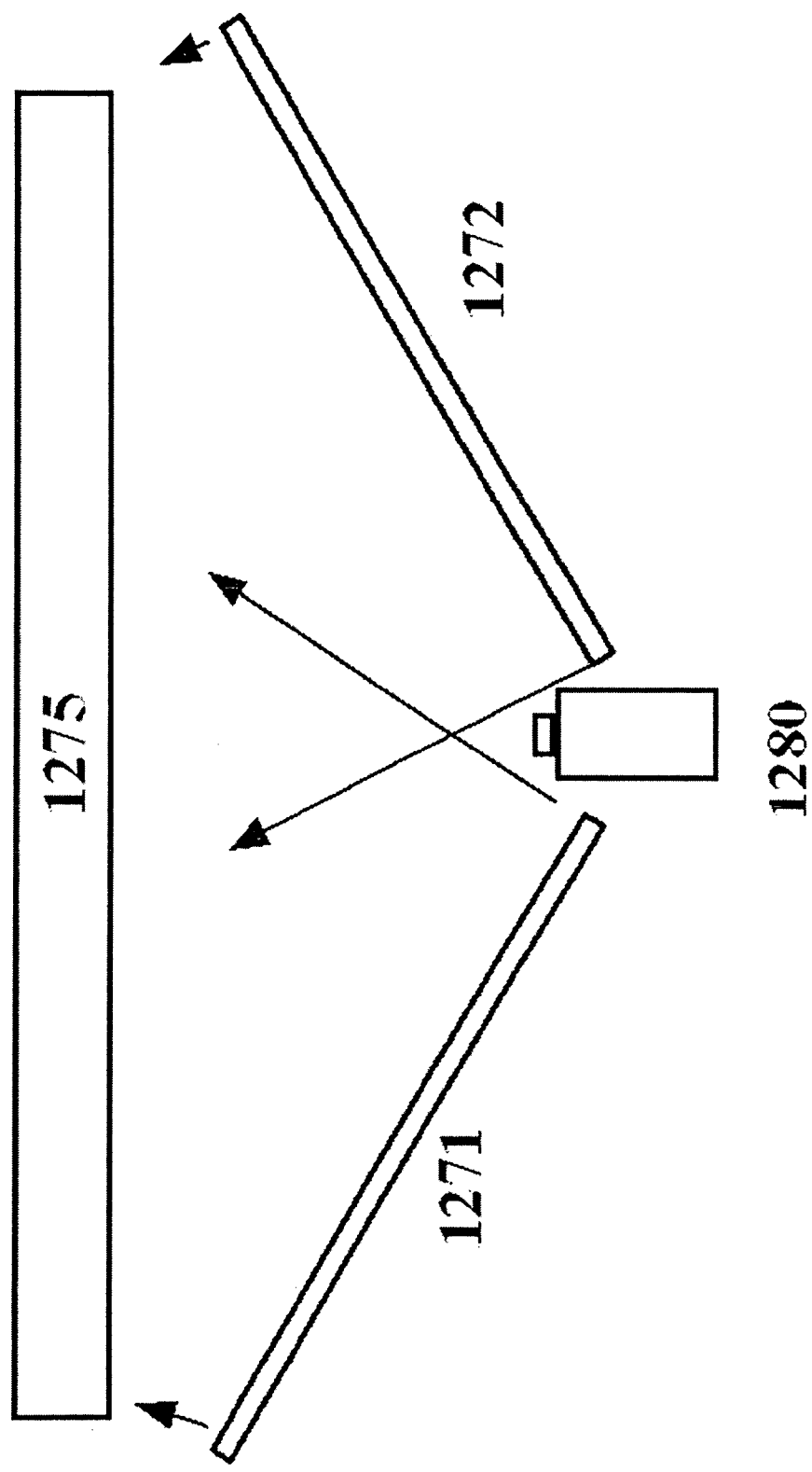

FIG. 12c illustrates a split backlight arrangement in which a plurality of backlight panels 1271, and 1272 for example are used to illuminate LCD 1275. The panels are mounted as shown so as to clear the image field of camera 1280. There can be additional panels beyond those shown, for example above and below the camera and aimed at the screen as well.

Figure 12D:
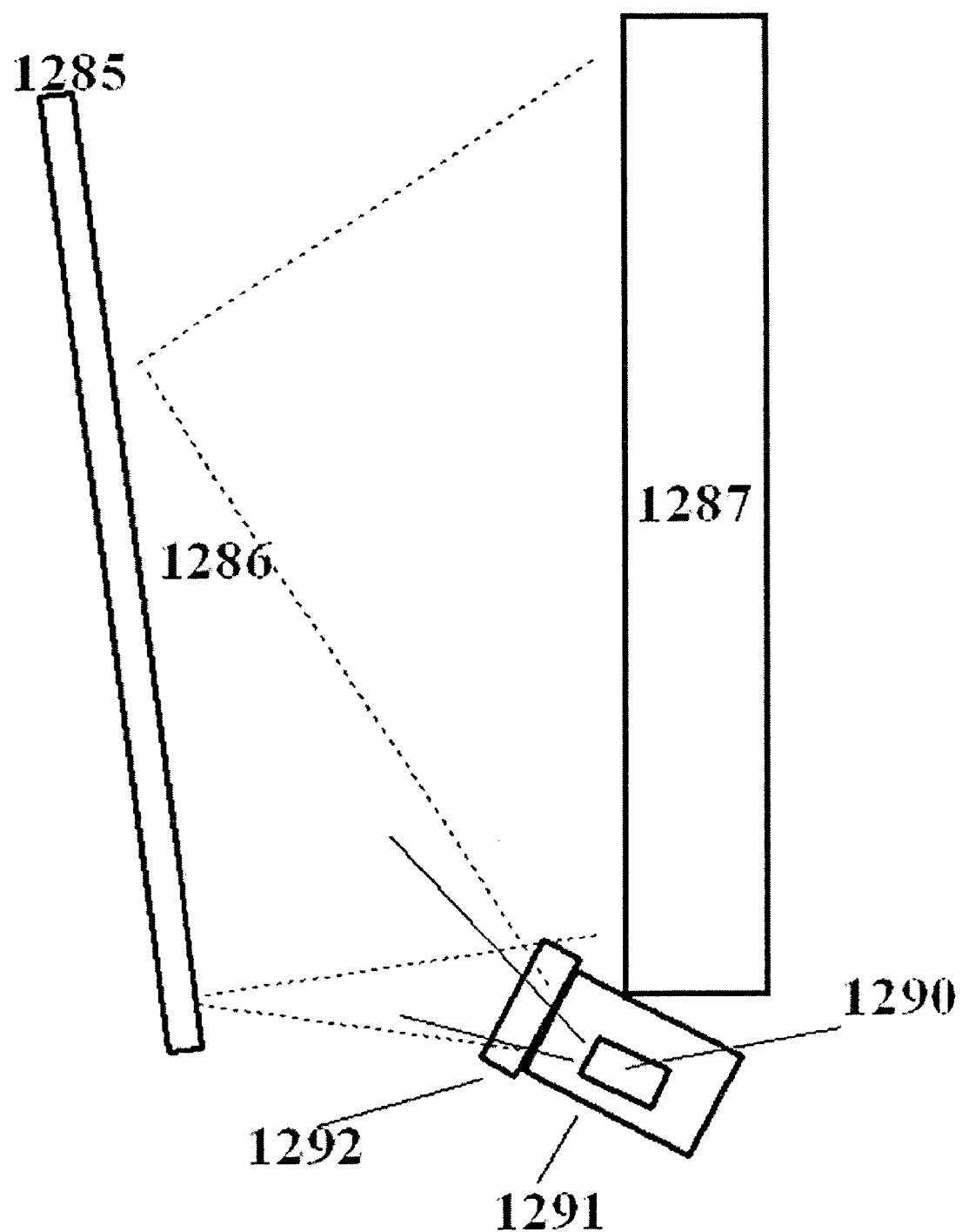

FIG. 12d illustrates a backlight panel 1285 having a front surface 1286 on which an interference coating is applied, transmitting visible light from the backlight to LCD screen 1287 while reflecting Near IR at the wavelength of an IR light source 1290 used to irradiate the screen so that camera 1291 with IR band pass filter 1292 at the wavelength chosen can view the knobs or other details on the screen, or fingers. The mechanical arrangement allows a folded beam path from the camera, and generally compact unit. Because of differences in magnification, it can be desirable to tilt the detector array of the camera to keep the screen more or less in focus (precise focus is not required to obtain usable data from knob or finger locations for example). The magnification differences can be adjusted in the computer 1135 so as to provide correct location information. This is true in certain projection case examples as well, where mirror optics are used to fold beam paths.

Figure 13A:
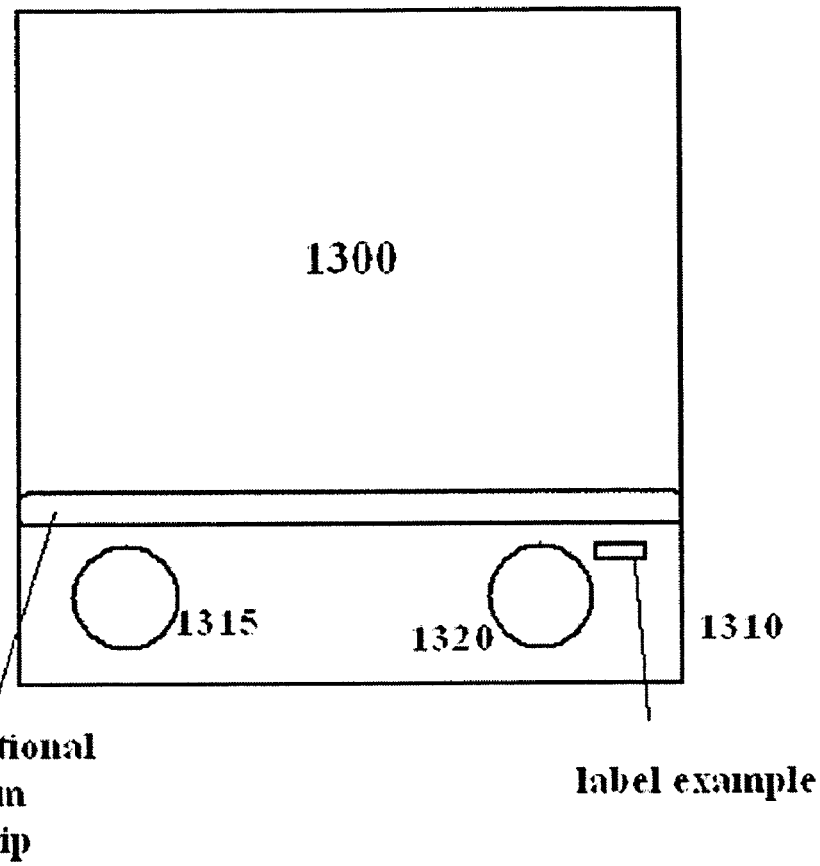
FIGS. 13a and 13b illustrate use of the FIG. 12 embodiment with conventional flat touch screens.

FIG. 13 illustrates use of the invention of FIG. 11 above with conventional flat touch screens such as 4 wire resistive screens, SAW touch devices, and force sensing devices. It should be noted that a conventional flat touch screen such as 1300 could be located on the flat LCD screen, such as 1310, as shown in the FIG. 3*a*. As shown, the knobs 1315 and 1320 are attached to the LCD top glass such as 1101 or alternatively a transparent over lay thereon, in this case in a region not where the touch screen is attached to 1310.

Figure 13B:
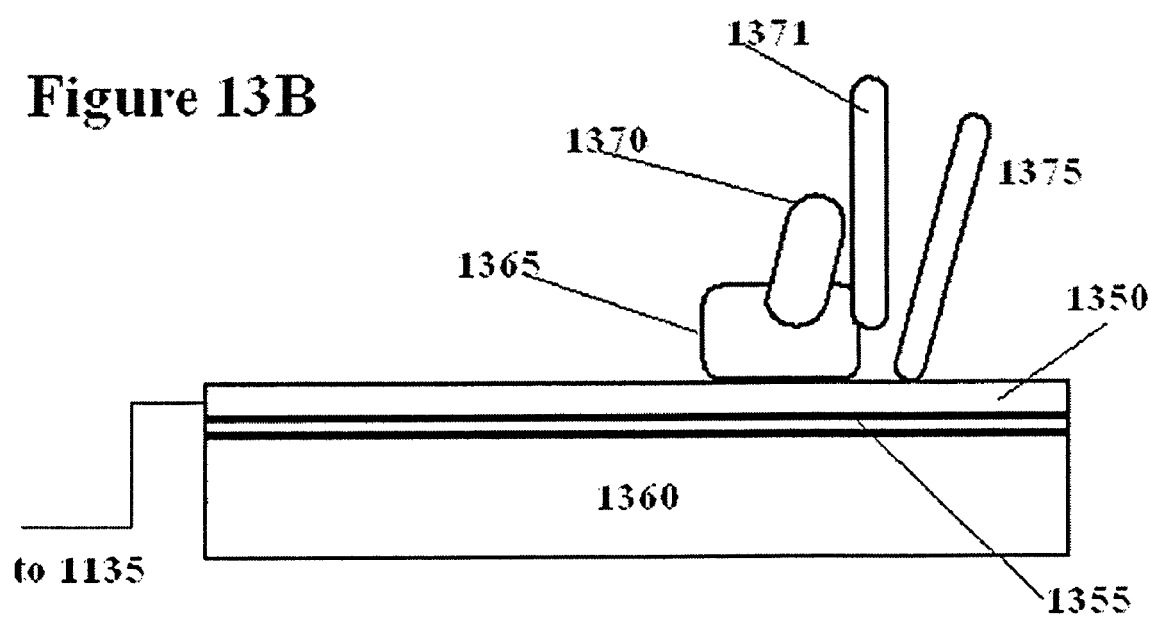

FIG. 13*b* however illustrates via a side view, a full coverage touch screen 1350 attached to and substantially covering the entirety of the LCD top glass 1355 of LCD 1360 and the knob 1365 (or other physical control detail such as a slider or switch) in turn attached to the touch screen, for example with glue. This is better looking in some cases, and has the advantage that the touch screen in the region of the knob can be used to register that the knob was pushed in, either to signal that the knob is to be read, or that the reading is to be selected, for example. The touch screen can also be used to sense touch of a person's finger working the knob. This could allow a knob turning user to add extra command information with the same hand and at the same time, an important issue for car drivers. This sensing function near the knob can also be done optically using the invention as disclosed in FIG. 11.

For example consider thumb 1370 and forefinger 1371 turning the knob 1365. The user can slip his forefinger down and touch the screen as desired to indicate a command to computer analyzing the touch screen output location. Such a command might indicate that the correct knob rotational position has been reached. Or one can use ones middle finger such as 1375 to make the touch indication as shown.

FIG. 14 illustrates operation of the invention in a reflective LCD system 1400. In these devices a reflector such as mirror 1405 is used to direct front light 1410, which has passed thru the system back thru the system and to the user. In this case we can employ a partial mirror 1405, which transmits some light (e.g. 20%) from a light source such as LED 1460 used to illuminate the front of the LCD (on which knobs or fingers etc are located, and sensed in turn by according to the invention by a TV camera, or other electro-optical detectors which might be used in place of a TV camera). The 20% transmission still allows some reflected light from 1460 to reach the camera 1420, but it is not very efficient since both the light from 1460 and the light in turn reflected from the details on the front surface of the LCD reaching the camera are attenuated by the passage thought the mirror.

Figure 15:
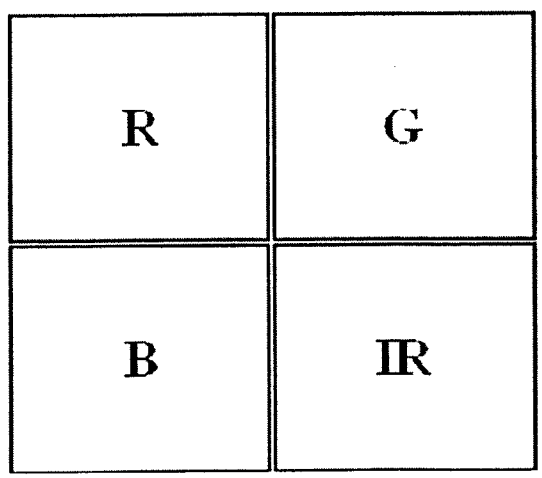
FIG. 15 Illustrates an alternative LCD system having a 4th illumination "color" pixel.

To improve efficiency the device can utilize the same arrangement, but with the mirror 1405 in this case comprising a alternative type mirror, such as an interference film based device known in the art, which reflects visible, but passes the IR wavelength of for example an IR LED light source 1460 operating at a wavelength of 880 nm, which wavelength can also be seen by the camera. The camera 1420 in this case can be provided (as it can in FIG. 1) with a filter 1470 in front of it to pass only light at 880 nm and a small wavelength region around it (typically 50 nm or less) into the camera. This improves the signal to noise of the camera system, since stray reflections and other light in the visible passing through the LCD are not viewed. Note that in this case the interference-based reflector itself is a narrow band pass at 880 nm and may in addition, or alternatively perform this function. The above arrangement will work in transreflective LCD systems too assuming proper backlight considerations are followed, per FIG. 1 or 2 or otherwise FIG. 15 illustrates a pixel (actually a group, whose colors add to make a single illumination pixel) of an alternative LCD color filter having a $4^{th}$ illumination "color" pixel, such as produced by a near IR filter (for example at 850 nm), in addition to the normal RGB grouping of filtered pixels, in order to illuminate the knob, other physical detail, or fingers. This allows such illumination from this IR filter region of every group of pixels to operate in the condition of full transmission, without disturbing the image seen by the user from the other 3 pixels in each group. While one might still prefer to use the technique of FIG. 11, such as utilizing full transmission say from all pixels in certain regions such as 1140, this allows one to controllably project IR with the LCD screen over the whole screen surface and determine arbitrary touch locations not respondent to particular choices of projected data such as icons with transmissive center regions (appearing white or similar). This added pixel technique provides less light to work with (compared to FIG. 11) and loses light for the display purpose as well. For the latter reason one might have only one group of pixels in 4 say, equipped with an IR pixel, if sufficient light was still available for the camera to get reliable images.

Now illustrated is a projection type RTD instrument panel embodiment of the invention employing both fixed and writable data images is now disclosed. It is particularly of near term use where cost is a concern, and only a limited number of choices of control panel configuration (e.g. a Instrument Panel center stack with a "heater" or "radio" section projected sequentially) are involved. In this case, a simple scanning device is used to "write" labeling, graduations, indicators, and other graphics on a fixed type of projected image (which may be changed using a change mechanism if desired, but remains a fixed image during the programmable display writing process). This scanning device, generally employing a red diode laser, and optionally other colors, can also be used to sense control detail position and touch location as has been disclosed in my co-pending applications.

The projection section of the RTD can have a DLP, LCOS or scanning mirror flying spot based projector as has been previously disclosed in co-pending applications. However, there are problems with each today.

The LCOS is having commercial problems, and like the DLP which is commercial, needs LED light sources to be really practical for cars. Suitable LED projectors are just appearing (e.g., Mitsubishi "PocketProjector", but it isn't clear they will be ready with enough light intensity soon. The DLP and LCOS types can be used to sense control position and touch location as well as project, as disclosed in the recent scanning projectors application and other of my co-pending applications, but this takes time from the projection cycle. A preferred solution, is the flying spot scanning type projector as promoted today by Micro vision and perhaps others. This can nicely be used to both sense as well as project But this approach suffers today because it appears it really needs a laser to get good resolution and brightness of the display, and there are no low-cost practical lasers in the green and blue (though blue may come on stream with the new DVD players, and green may be available by 2008 we understand). It may be possible to use LEDs as sources instead of lasers.

Figure 16A:
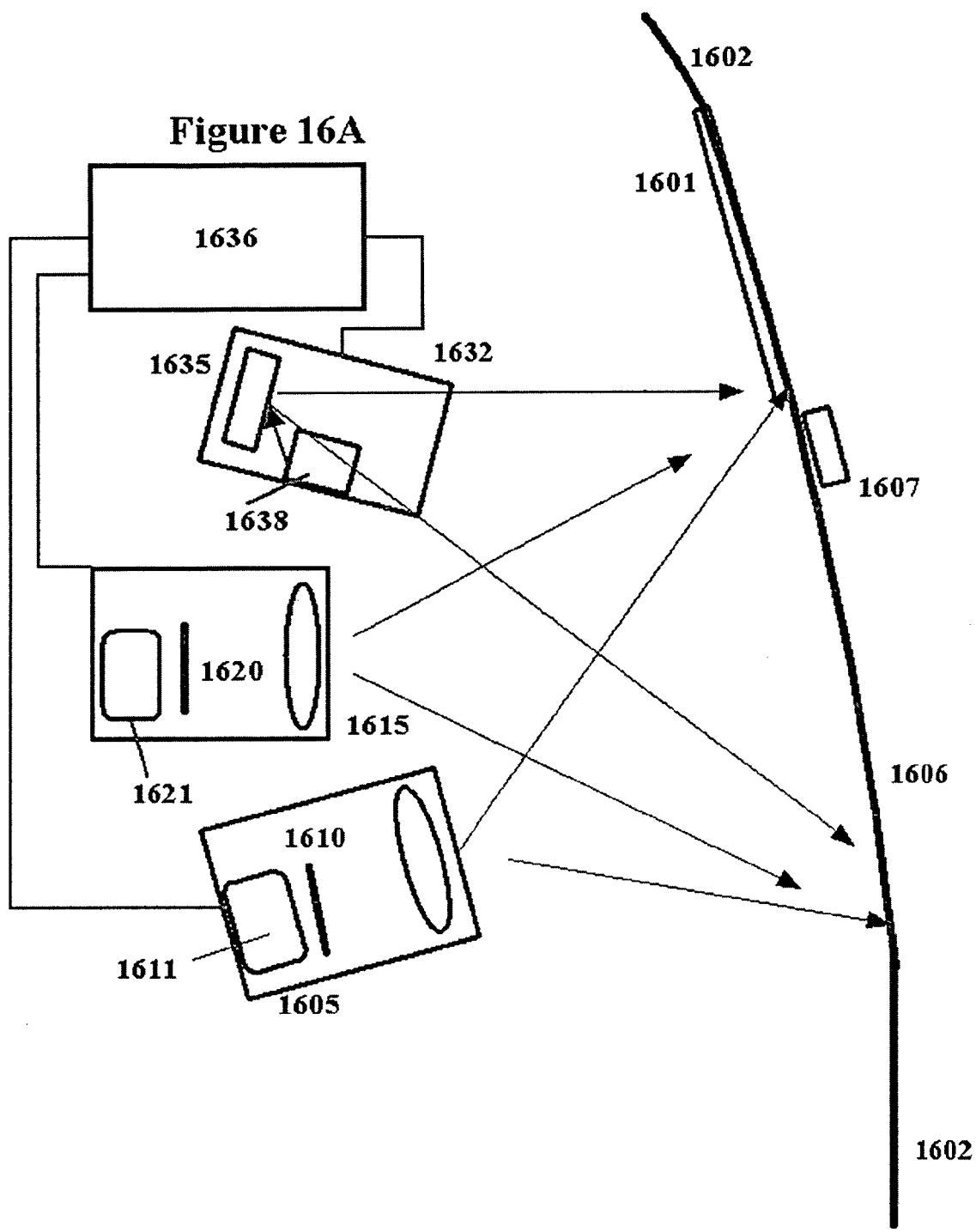
FIGS. 16a and 16b illustrate a hybrid projection instrument panel embodiment of the RTD invention employing fixed and writable data images.
Figure 16:
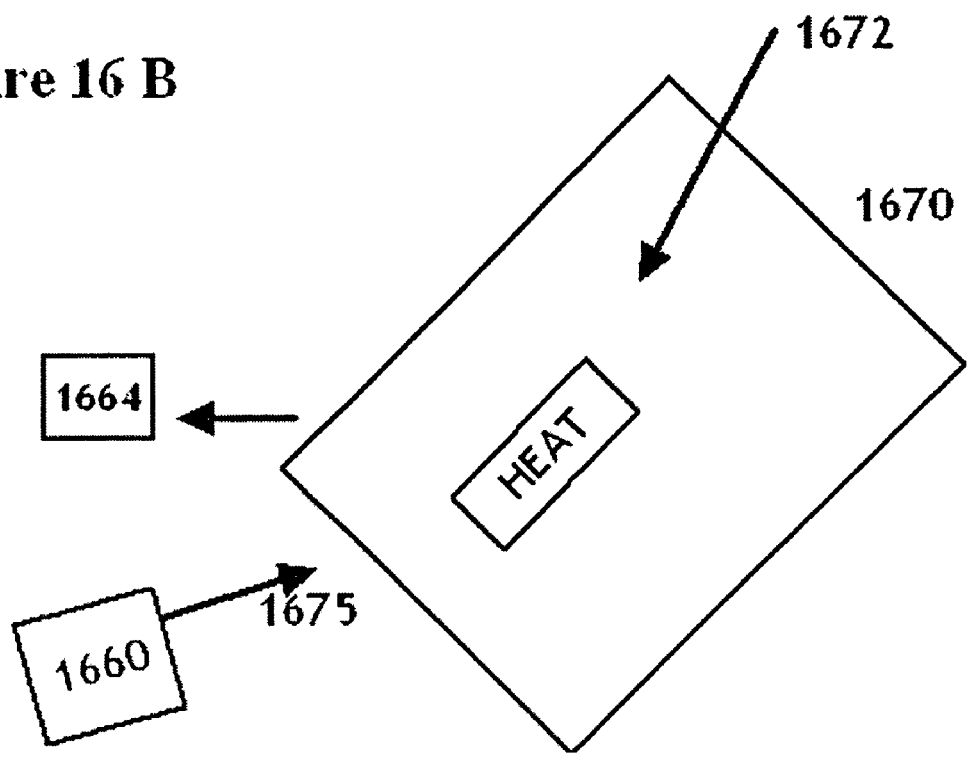

One approach to answer the aforementioned projection display conundrum in the near term is to use a combination of technologies. Shown in FIG. 16A is a new system that has three components.

- A conventional LCD display 1601 for variable image data. In this case we might consider it located in a center stack of a car instrument panel 1602 having an LCD display of conventional type (e.g. 9 inches wide, and 5.5 high say). This display could alternatively be any other kind of display suitable for the application in the vehicle, for example a projection display.
- A fixed slide type projector 1605 for projection of "N" slides such as 1610 on rear projection screen/control surface 1606 having for example a knob 1607 on its front face (generally in conjunction with other control details). This system might typically have N=3, with fixed graphical and label data for a section of the instrument panel relating to each choice such as Audio, Climate, and Navigation, or some other choice of control graphics. This projector can interchange slides 1610 with a turret or shuttle mechanism as in historic slide projectors. Alternatively, one can have a brute force but mechanically simple solution such as shown, using a fixed slides and a second projector 1615 projecting a slide 1620 of different graphical design from that of 1610. For example the design projected by slide 1610 might be of an audio section of a instrument panel center stack, including typical radio and CD controls. When a climate control function was needed, this slide projector is turned off, and projector 1620 turned on with a slide of a climate control, with temperature fan speed, air distribution and other desired graphics thus displayed. Typically, white light LED sources such as 1611 and 1621 respectively are desirable for this application and are employed with suitable projection lenses such as 1612 and 1622. in some cases for displaced projection fields one can use the same lens. The fixed projectors are controlled by computer 1636, which also is typically used to control LCD or projection display 1601. It is noted this display can overlap the projected fixed image display.
- A flying spot type mirror scanner 1632 is also employed in the embodiment shown, using a two axis programmable mirror 1635 controlled by computer 1636 to sweep a beam 1638 from a red diode laser. The fixed data from the projector such as 1605 can be dynamically modified by projecting on top of it light from the red laser of the flying spot type mirror scanner, which also would be equipped if desired to do the sensing in a manner described in a co-pending application. It is noted that in the simplest case, one can just use this to project one color information and not use the fixed slides. Or you can use a fixed LED with no slide to project one or more color fields (depending on the LED color(S) which are then overwritten to create a new color where desired by the scanning red laser. Other laser colors when they become available such as blue, can also be used.

The simplest situation is to project with the fixed slides just the radio and heater portions of the instrument panel. In this situation The radio and the heater may if desired, both rely on using the LCD screen to display all kinds of relevant data, but with simple changing data and labels done with the scanned laser projector. The fancy full color stuff one might wish can be provide on the LCD display.

Where a fixed slide and white light source is used in the above, the information projected and its colors and gray level distribution would be on the slide and thus fixed.

Alternative to a white light LED in the above, the light source could be a bank of red green and blue LEDs which are individually programmable. The actual color projected could then be variable if you used the RGB LEDs and varied the voltage to each of the three RGB LEDs, and could be mixed with the red laser scanned beam used for labeling too. By turning off the red LED, and using the laser, the label would be white in at least some slide configurations—one such configuration would be to have no slide at all—just have a background of blue plus green (which could be mixed in varying amounts). The background turns white when the laser hits it, if all colors are in proper proportion.

It is noted that a projector can preferentially be used to put more light in to the labels projected (at the expense of less important projected graphics for example) to make the labels more visible, especially when bright sun is on the screen. The flying spot scanning type projector such as 1660 shown in FIG. 16b can perhaps best be used in this mode. For example if the detection circuitry of the sensor (or a separate sensor for the purpose such as 1664), senses the presence of strong sun background on the screen 1670 such as from sun rays 1672 the scanning laser beam 1675 of the projector 1660 may be caused to take five times longer to write a label such as "HEAT" on the screen than the graphics or other information displayed in other areas of the screen This is generally satisfactory, as any resultant decrease in the graphics intensity is spread over the whole graphic image projected on the screen, or in areas not needed at the moment, or other areas often of peripheral importance. More specifically, one can favor the important labeling and an other important image data at the expense of less important data, wherever it may lie. If the direct sun radiation on the screen, is temporary as it often is, the projector can favor the labels almost totally. Or favor the graphics and labels of particular region of the instrument panel which is in use, or of more importance during this sun radiation period. It is also possible if necessary to solve this problem, to permanently print white (or other light colored) labels on the screen, which will show in sunlight relative to the black background of the 3M vacuity diffusing screen material if used, as I have found generally desirable.

Disclosed now are novel physical control details which are constrained, typically at one end, or both ends, which may be used with the instant LCD based inventions, or projection based screen and control surface inventions of my co-pending applications. Torsion (twisting) and bending of a member such as rod 1701 attached to transparent control surface 1705 rigidly fixed to a control such as knob 1710 are used to move the control object such as a turned knob. A datum 1712 on the knob 1715 indicative of knob circumferential position is monitored, in this case through the control surface, by electro-optical means such as TV camera 1720 whose image is analyzed by a computer not shown which also controls video projector 1730. This uniquely results in an control that returns to the original physical position (if the material stressed its elastic and there is little hysteresis). The ability of the invention to programmable change designation of such controls, and to deal with their calibration (for example, via look up tables correlating movement or control variable change to image change) and to set the control system zero at arbitrary non-mechanical zero positions of the physical control is very interesting and useful. Without the invention, such controls would be much less practical which explains why you don't see them.

In addition, the invention, because of its programmable labeling, for example using a projected image generated by video projector 1730 diffused from diffusing material such as 3M Vacuity black bead material 1740 enables a new and more tactile control paradigm in this regard, as it becomes possible to turn knobs, or move other linear devices in a manner that the user always moves them, starting from what he knows is the zero position and value, rather than the last value set at, which he might have forgotten (common place in some car controls for example). This means you don't have to glance at the label before making a control move to see what value the control is presently at (though you can, thanks to the invention), you just turn it what you think the right amount is, from your tactile understanding of that control element. This is much different than vehicle hand controls today, since this control of the invention returns to zero even though the controlled value is at the last setting before you let go. The result is something very tactile in nature. If you want to move to setting 5, the max setting of fan speed for example, you have to turn it to the maximum, and this results in the farthest movement (in this case angularly) and the most opposing force, as you are torturing the system. F=kX which is Hooks law defines the function. Indeed with a little practice, one can learn the positions more or less by feel, without taking ones eyes off the road, a big plus.

With the invention, it is not necessary to have a member such as a knob, or a slider free to move in at least one axis. One can have a member used for control which is held at one or more points. This is also true, and even easier to achieve in the co-pending invention which utilizes a projector. Camera can see the control using back light coming behind the control (with sun or other backlighting) or in reflection using projector or special light sources for illumination, or both choosing the algorithm that makes best answer)

The camera sensor is extremely versatile for such controls and can see a degree of movement of any object used. This results in an interesting type of new control using strain in members holding a multi-position control element such as a knob or slider to move the element back to the zero position, even though the controlled variable stays at the point you moved it to. For example today in conventional practice, if you turn a knob from 12 O'clock to 3 o clock, this could be set up to indicate an increase of 3 values in the heat setting for example (1-3) from the 12 o'clock setting. But in the conventional control just described, the knob stays at the 3 o'clock position, at least until you determine a control change is needed and move it to another position.

With the invention embodiment herein, the same thing happens at least at first. You turn the knob to the level 3 position and the camera or other sensor senses that you did this, and thus enters the control command represented. However, due to the constrained elastic suspension, for example provided by a rod put in torsion by turning the knob from the zero position, the knob does not stay with its physical pointer pointed at the 3 position when you let go, but rather returns to its mechanical zero, with however, its projected indicator remaining at the 3 position (assuming this is desired, any position is possible as the indicator is computer generated). Thus this system works such that the user always turns from the mechanical zero to the position desired, not from the last position the knob was set at. This is in many ways more intuitive, as one can feel how far one turned it without looking to see the graduation or other indicator of the amount on the control. If you want a higher value next time, you turn it to 4 o'clock say and the indicator, such as a dot, is projected to be at the 4 position. A major feature in a vehicle especially, is that this works in a practical USA Federal Safety Standard FMVSS 101 control and labeling regulation sense because the label indicating the setting reached can be displayed electronically from the sensed data itself, and does not have to be fixed in a given graduation position on the instrument panel In short when you turn it to 3 position that label is displayed (including a written description if desired, such as FAN SPEED 3, rather than just 3), even though the knob sprang back to its mechanical zero position at 12 o'clock. And it may continue to be displayed, until you turn the knob (or move the slider in that case) again.

The control above feels like a zero returning control such as those commonly used for window lifts. But the control of the invention herein is position based, not time based, as all other return to mechanical zero controls of electrical and electronic devices I believe are. And it is multi-positional.

Figure 17:
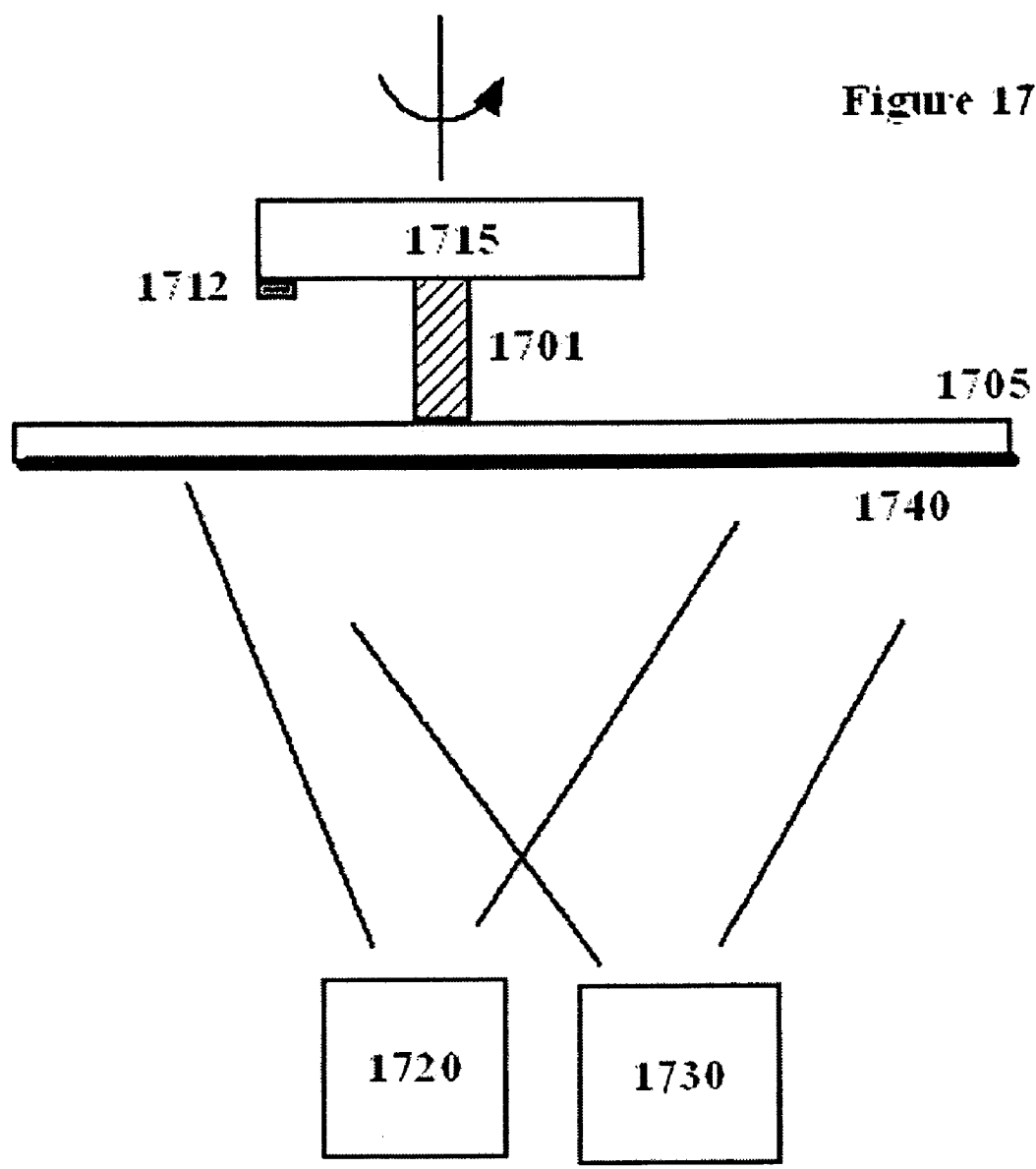
FIG. 17 illustrates inputs using constrained physical controls, optically sensed and programmable displayed, for both LCD and projection devices of the invention.
Figure 18:
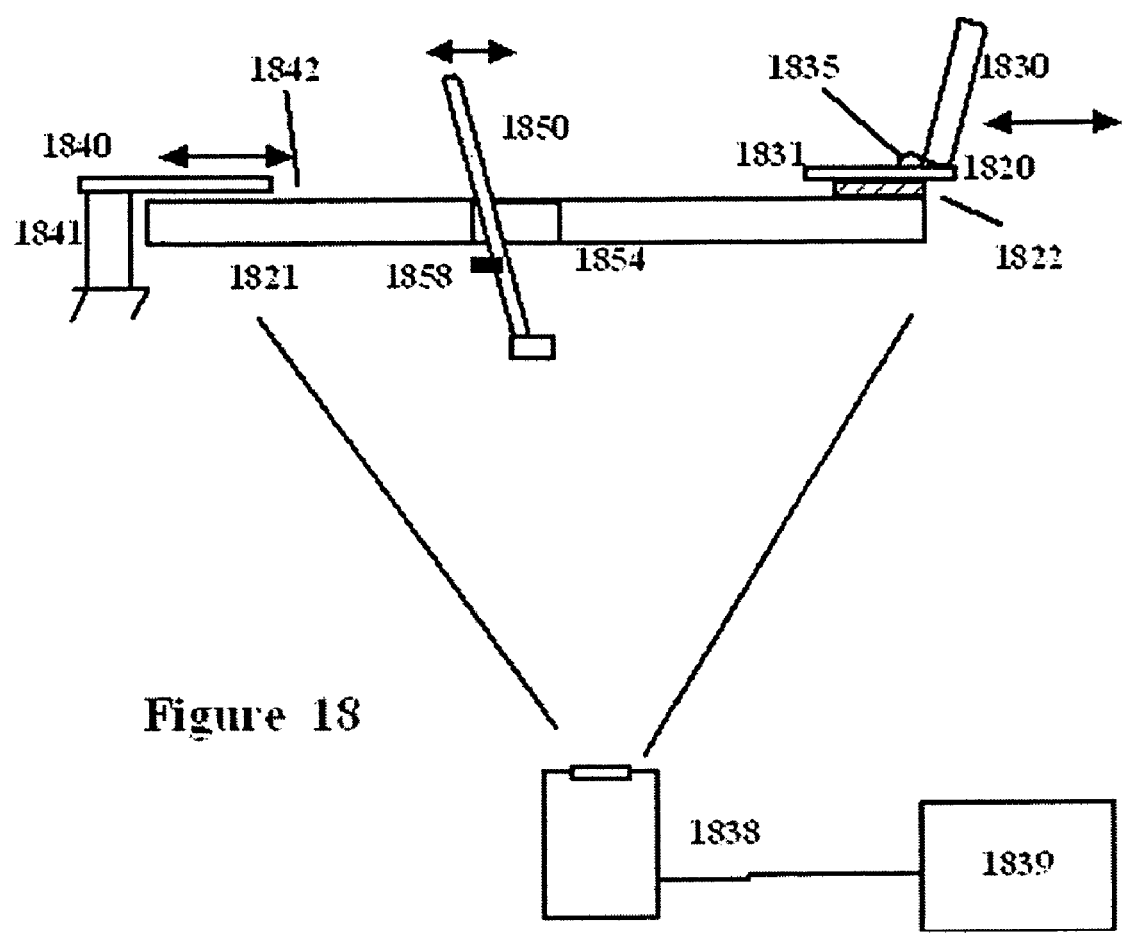
FIG. 18 illustrates novel switch designs using naturally occurring features of an instrument panel.

FIG. 18 illustrates novel switch designs (many of which like that of the knob of FIG. 17 above have an elastic return to home position) using naturally occurring features of an instrument panel or other member, in this case a piece of plastic trim 1820 which is near or overlapping (as shown) the front side of projection screen/control surface (or alternatively an LCD display in some cases) 1821, shown in side view. This trim piece is secured by an elastic rubber 1822 (which is glued to the front surface of 1821 as shown, or to another member nearby), such that it can move sideways (producing shear in member 1822) to the left in the drawing when pushed at the rear by finger 1830 of a user. The left edge 1831 of member 1822 is sensed by the camera 1828 and computer 1829 of the invention in a manner similar to the datum 1715 on the knob of FIG. 17, or other member edges as disclosed in co-pending applications. An alternative push may be given by pushing on a ridge such as 1835 or a groove which may be provided in or on member 1820. Alternatively too, movement of another edge of the member 1820 maybe sensed by camera or other electro-optical sensor 1828 whose image is analyzed by computer 1839.

FIG. 18 further illustrates another side moving control also moving laterally in the field of view of the camera, in this case plastic member 1840 mounted to flexure 1841 and pushed from the side over the screen/control surface top surface 1842 to enable sensing (and labeling) to take place. It is noted alternative flexures, or cantilevers or membranes or other elastic members can be fixed in different orientations, while still allowing control functions to be derived from movement of some edge or datum in the field of view of a camera or other electro-optical device.

Also illustrated in FIG. 18 is a lever control 1850, which is constrained at its lower end via a pin and operates thru a slot 1854 in control surface/screen 1821. Once again in the position of a datum such as 1858 at the lever end at the screen is sensed thru the screen and reported by the camera analysis computer 1839 to a computer such as 1135 (which may be the same computer) so that proper control inputs, and labels and other data can be projected in accordance with the control setting made.

Figure 19:
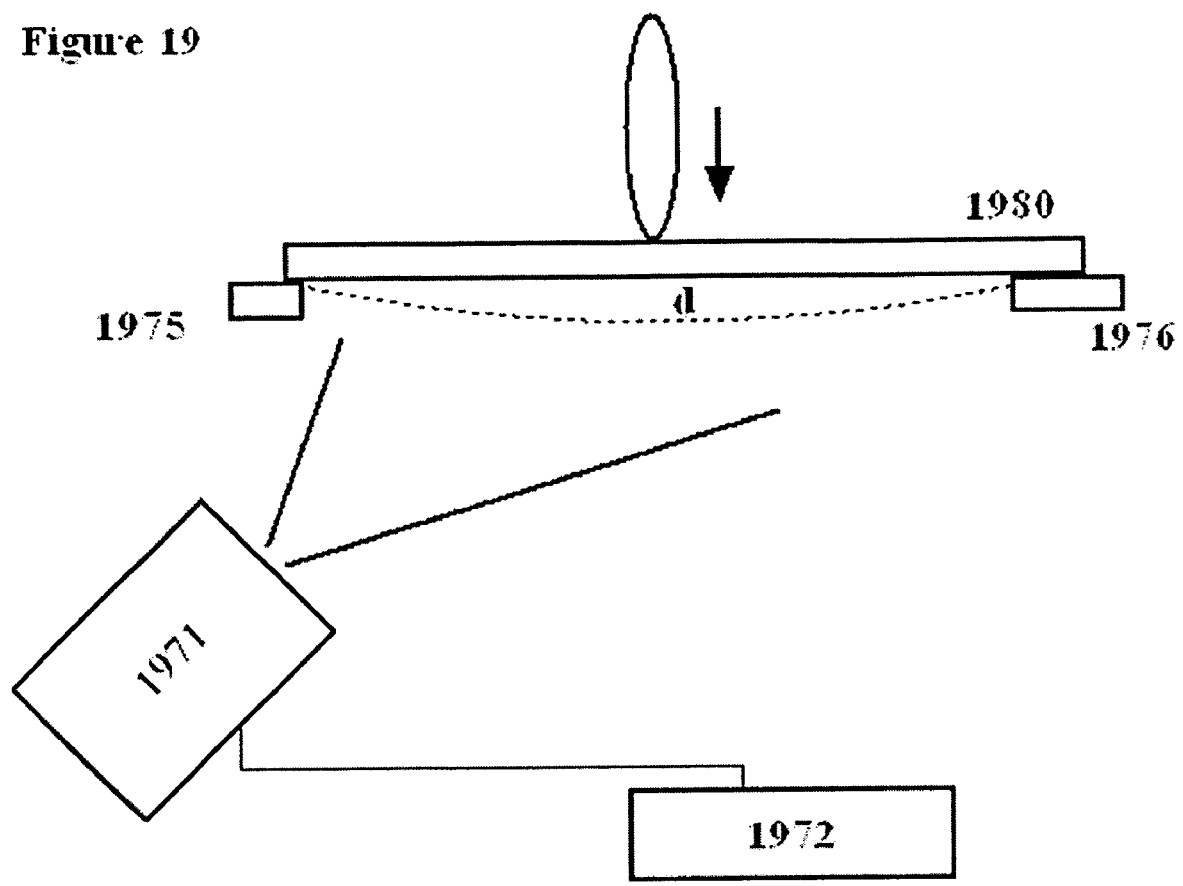
FIG. 19 illustrates a machine vision detected switch with a trim piece deflected centrally.

FIG. 19 illustrates a machine vision detected switch with a trim piece 1980 deflected in this case centrally and observed by TV camera 1971 and computer 1972 of the invention. The trim piece is held at two ends 1975 and 1976 and moves as shown in dotted lines when pushed by a finger or other object shown. The invention allows the deflection "d" to be sensed (typically but not necessarily from the rear of the screen/control surface) not only that a threshold of movement has been made indicating a switch function has been tripped, but if desired, the amount of movement. This can if coupled with an LCD or projection display for example be also indicated by display of a corresponding label compared to the action taken, such as FAN SPEED 3. (if pushed in less far, resulting in a smaller deflection d, the speed would indicated speeds of 1 or 2, for example. This switch design, and those of FIG. 18, works when the switch is moved in front of an LCD or projection display such as described above, where machine vision sensing is from the rear of the display, or can work when the member 1980 is seen from the front for example, along the lines of my co-pending application "Camera based man-machine interfaces".

As disclosed as co-pending applications, controls of both the embodiments of FIGS. 18 and 19 may alternatively be sensed from the front or user side, rather than from the rear, by using a TV camera or other electro-optical sensor.

The control devices above have generally been disclosed as physical controls such as knobs, which are seen with machine vision from behind, considering that the user of the control such as a driver of a vehicle is in front, and grasps the control from the front. It is also possible to detect the control from the front using machine vision, as is disclosed in my co-pending application entitled Camera based man machine interfaces (ref 5 above). This application describes another approach where the control is seen from the front using at least one TV camera. Disclosed below are controls of this type for the use by passengers in the vehicle, and to further include controls viewed from the side, and controls in which the reflectors are blocked or exposed to effect the control. This blockage can be due to a member as was disclosed, or due to the action of the user's finger for example as disclosed below. The control details such as knobs or the reflectors utilized for these functions are typically, but not necessarily, located on seats or door panels of the vehicle such that they can be seen by cameras mounted in the headliner or pillars of the vehicle.

It is also of interest to provide improved means to operate rear seat entertainment systems and to provide games and other amusements for passengers of a vehicle, which can be achieved with the above techniques. A large percent of minivans and large SUVs are being equipped with rear seat entertainment devices including a LCD screen. There are however problems fully utilizing these devices since the controls need to be accessible to all passengers, and all passengers are presumably belted in. Some are even further constrained in child seats. Controls for such systems have been very limited. How indeed does one expand the utility of such systems beyond just playing DVDs? The invention is aimed at adding control functionality for Navigation, for Surfing the net, for games. Also disclosed are special TV camera based games that can be played in the car along the lines of Sony's Play station "EYE TOY" type, which monitors hand and head movements in relation to displayed images on a screen. Embodiments answering these needs are disclosed below.

First disclosed for controls within a vehicle, are those where the user can block or expose light with their fingers or other body parts to actuate the control. In some cases the body part is used directly to make the control function occur, such as raising the volume of a rear seat entertainment system.

Figure 20A:
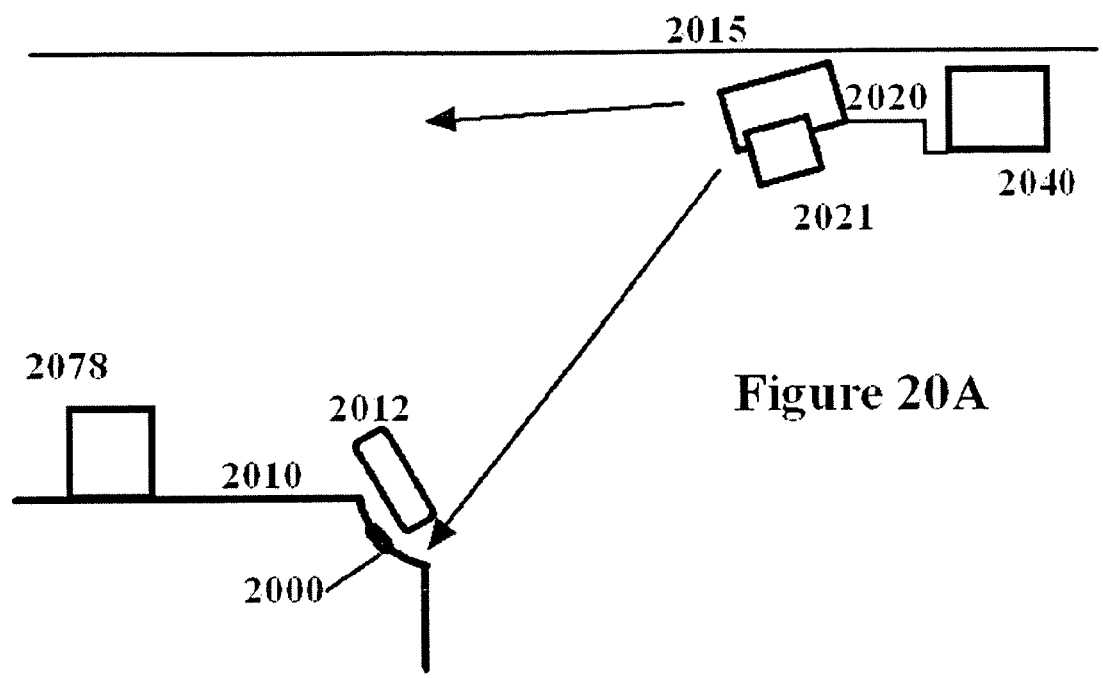
FIGS. 20a and 20b illustrate TV camera based controls for Car Interior functions.

FIG. 20a illustrates a form of switch in the car interior or other location, where a user may cover, or expose, a reflector, preferably a retro-reflector with his or her finger (or alternatively another member) in order to change the signal to a camera located in a position to view the retro-reflector.

As shown, a retro-reflector 2000 made for example of flexible 3M Scotch light type 7615 glass beaded material is provided on a rear door armrest 2010. Such material can, if desired, be curved as shown to flow over contours of seats, armrests, and other interior components aiding its use in cars, homes and offices. In this example it conforms to a concave section making it easy for the user to rest his finger 2012 on it, and feel where it is, in an otherwise flat section of the armrest. A camera 2020 and IR LED light source 2021 attached to the headliner of the vehicle 2015 illuminate and view the rear seat area including the armrest. When the user is sitting in the seat, and normally resting his hand on the armrest, the retro-reflector is typically uncovered in this example, and a strong signal is returned to the camera, since the LED 2021 is located near the camera axis. Alternatively other reflectors than retro-reflectors can be used, but their signals are not as bright, and more image processing sophistication is required to see them in some conditions. When the user wishes to signal the computer system 2040 connected to the camera and analyzing its signals, he just covers the retro-reflector 2000, which may be as easy as sticking his finger 2012 in front of it. This particular location in the field of view of the camera could for example be used to turn the DVD player on for watching on a screen provided to the rear seat passengers.

Feeling where the reflector is, can be aided by for example providing tactile cues, such as a small recess or protrusion in the armrest, to act as a tactile guide for the finger. A concave portion as shown also acts to shield the reflector from scrapping type damage at the same time. The computer 2040, controlling devices in the vehicle, detects the command from the absence of light in this case, caused by the finger covering the retro-reflector, which ordinarily provides a strong return signal, orders of magnitude more than the finger, and easily seen. The user can signal many things in this way, and multiple reflectors in the arm rest, or in different locations such as the seats, door panels and the like, can also be used and similarly sensed with the same camera if desired. Indeed the return signals are so strong that a single camera can sense all such input devices in the whole rear seat area within its field of view, such as might be on right and left armrests, or on seat cushions, on side pillars of the vehicle, or on child seats brought into the vehicle, should a toddler in such a seat wish to command for example a DVD player (to turn on, change films, etc) or provide a signal to his parent. Or if a camera is aimed at the parents face while driving, the toddler can for example cause that image to come up on the DVD video screen.

While the embodiment of FIG. 20 of the invention operates preferably with retro-reflective members, it can operate using members of any type, illuminated by any suitable lighting, if sufficient computer processing is available to extract the reflected signals from the TV camera image. The difficulty of this depends in turn on the contrast between an object such as a finger and the member being covered by it (which contrast, in the retro-reflection case, is very high). Despite the wide variation in lighting that can exist in a vehicle, the sensing problem is aided by the fact that member locations are fixed in a given environment such as the interior of a vehicle, and the camera image can be analyzed just in those locations, to determine the position of the object with respect to the member indicative of the control input desired. To aid in determination it is also helpful in many cases to compare images obtained of the member when not blocked to instant images, which may be blocked.

Figure 20B:
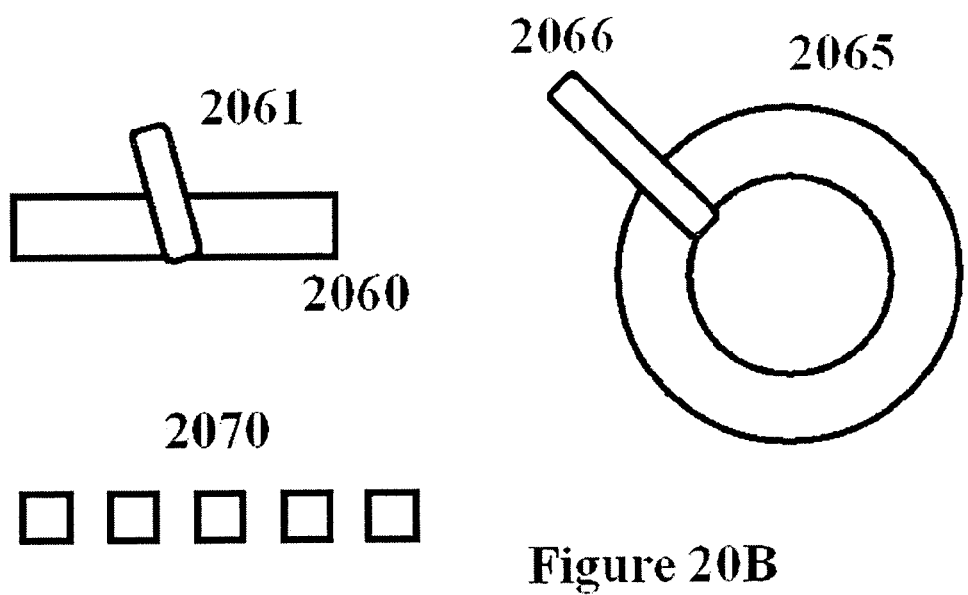

It should also be noted as shown in FIG. 20b that instead of a switch one can make a continuous control or a stepped digital control. For example consider linear strip of retro-reflective material 2060. If one puts ones finger 2061 on it, the return light to the camera is blocked at that location, and with ease one can use the camera to sense a control of value one to 10 from one end to the other of the strip in this way. Similarly a circular control can be made, such as 2065 blocked in one angular section in this case by finger 2066 on it, which angular position the camera is easily able to tell within 30 degrees or better, with the indicated value corresponding for example to volume of a radio which might otherwise be conventionally controlled by turning of a circular knob in much the same aspect. In addition, one can make for example a digital version, by having for example five retro-reflective squares 2070. The one covered up by the users finger is the value desired.

It can also be noted that such retro-reflective material useful in this way may also be provided on the clothing of occupants of the vehicle or on accessories carried by the occupants. Such material is sometimes on clothing anyway for night time visibility purposes, though generally not in the location best suited for operation as disclosed above.

My co-pending application "Camera Based Man Machine Interfaces" has illustrated machine vision based sensing of control details such as knobs, switches, and sliders in the vehicle interior using a camera to sense their position. Such details may be located for use by the driver, or may be for use of passengers, including those in the rear seat where for example one might have knobs on a seat back of a seat in front of a passenger or head rest back. Or, if employed in the front seat area, they could be on the portion directly ahead of the front seat passenger. In these cases, such knobs and other details should be designed to be safe in a passive sense, perhaps being made of energy absorbing material, which is made possible in large measure by the non-contact nature of the sensing of their position.

It should be noted that such a knob can be constructed if desired like FIG. 20B too, where a rotating physical apparatus rotating about the center of circle 2065 rather than ones finger 2066 is used to sequentially block reflector 2065 as the apparatus is turned. Similarly finger 2061 can be replaced by a sliding blocking member.

It should also be noted that the non-contact electro-optically based sensing of the invention makes it easy to provide such details in place where it would normally be expensive or trouble prone to provide standard electrical control devices. Some examples are on removable seat portions, or folding down lap trays, or swing out, or even removable accessory control panels. There are wiring problems in minivan sliding doors too, which also make location of controls of the invention advantageous there as well.

For example the camera 2020 can be used as well to sense knob 2078 located on rear armrest 2010, in order to determine its circumferential position, which can in turn be used to control for example the sound level of a rear seat audio system. As in the other cases herein, the easiest and generally most reliable knob feature to sense in the variant lighting conditions of the vehicle is a high contrast artificial target datum such as a retro-reflector or bright colored dot. However, with sufficient processing power in the computer 2040 used to analyze images from the camera, a natural feature like a bump or mark on the knob may be used. The position can be referenced directly to the camera itself, and its matrix array and optical axis, or it may be locally referenced to a graduation for example on the object (in this case the armrest) on which the knob is situated. This is best if there are worries about camera position, but such graduations may not always be present or visible. It is contemplated that if they were temporarily not visible, that one can revert to a relative camera based method, since one can see the knob relative to its last memorized position to determine any user caused movement indicating a change in control desired. Sliders switches, dials and other physical controls can also be monitored in this manner.

Figure 21:
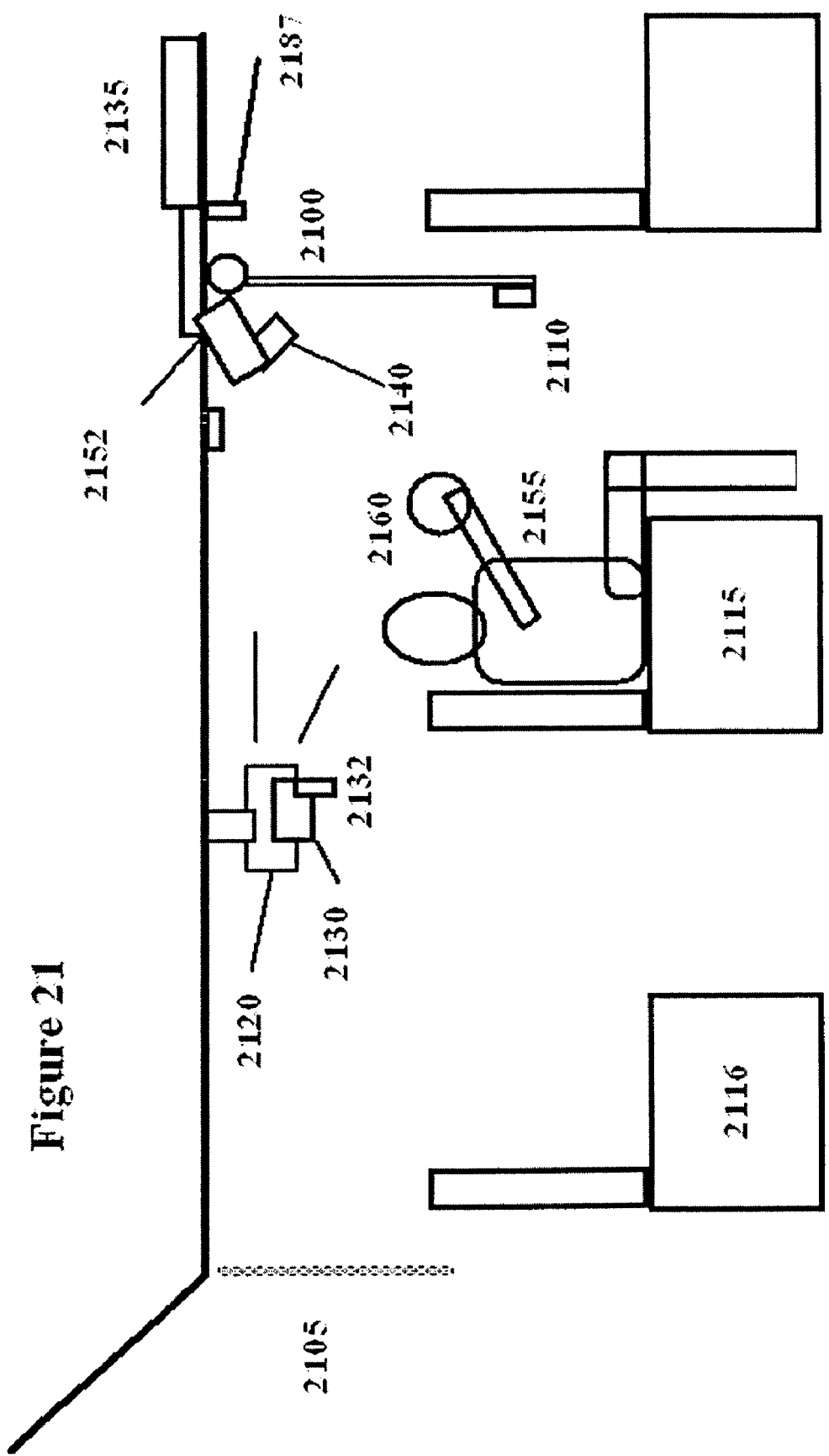
FIG. 21 Illustrates controls using physical control details, including demountable details, similar to that of my co-pending application "Camera Based Man Machine Interfaces"
Figure 22:
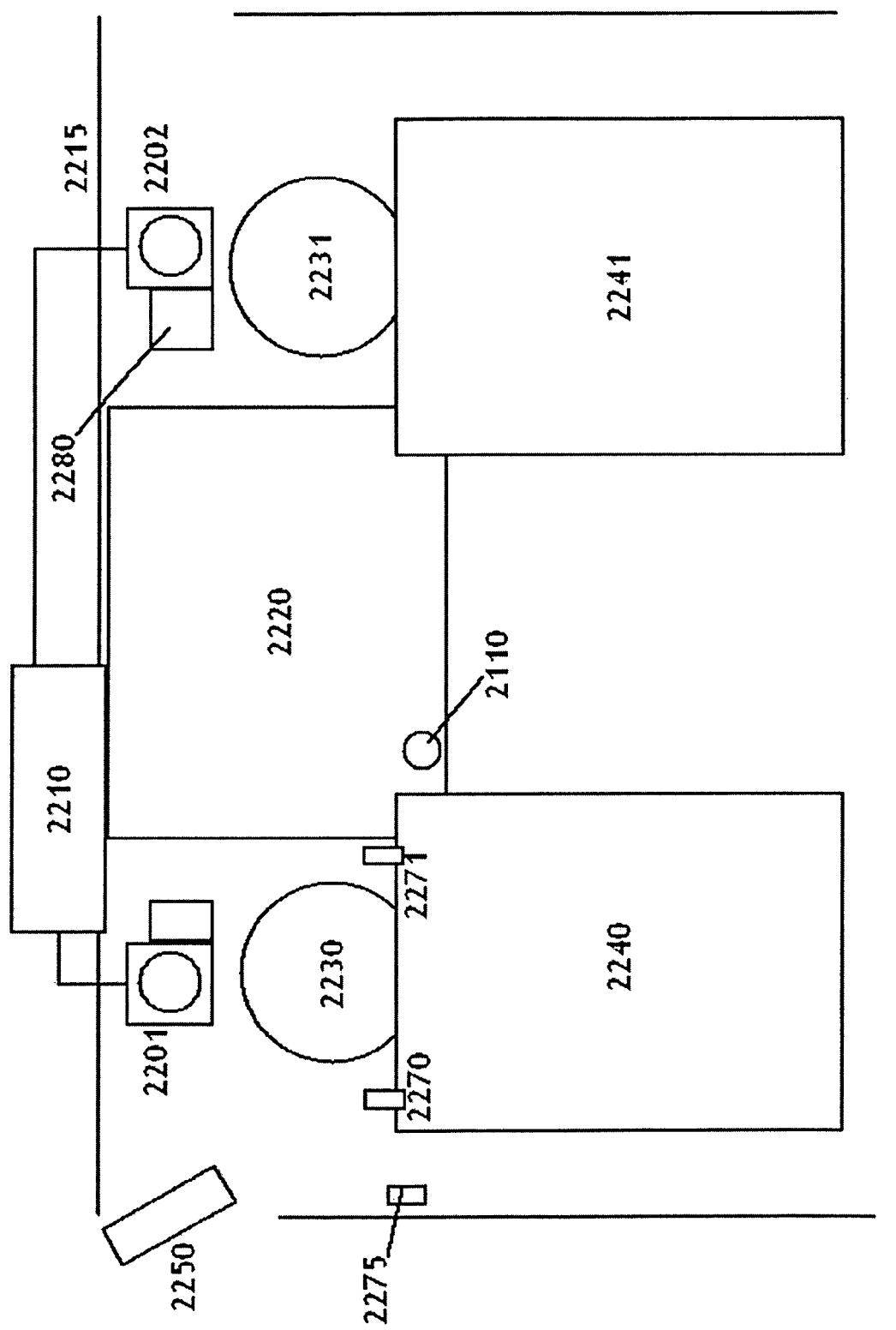
FIG. 22 illustrates a game, interaction and control system using a plurality of cameras in a car interior or other location.

Illustrated in FIG. 21 and FIG. 22 is an embodiment used primarily for games or another entertainment for rear seat passengers in a minivan or other vehicle. While it can be played using a conventional LCD screen sold today for DVD playing in the vehicle and typically mounted to swing down from the overhead console just behind the driver and right front seat passenger, it is shown here with a pull down front projection screen 2100 of the invention, which on its bottom portion contains one or more knobs 2110 used for operating a projector 2120 located overhead in the rear of a vehicle. This projector is capable of projecting a large screen area, which however can be advantageously rolled up and out of the drivers rear view when not in use. Camera 2130, in this case co-located with the projector, views the knobs 2110, to obtain data concerning their circumferential position, indicative of a control input by one of the passengers 2155 seated in the second row of seats 2015. For operation at night, or if retro reflective knob datum's are used, a separate light source 2132 is mounted near the camera axis as shown. The camera output is analyzed by machine vision program in computer 2135, for example Matrix Mil 7.0 running on a Pentium 4 computer, and interfaced to a Sony IEEE 1394 compatible camera.

It should be noted that the projector can be turned around on a swivel mount 2122, and used to back project on a rear projection pull down screen 2105 which can then be used to show video images for tailgate parties and the like. Here too the camera 2130 can also be swiveled with the projector to view the backs of control knobs 2106 on that screen. Or a separate camera can be used if desired fro this purpose, or other control means should they be desired.

The invention in this embodiment also comprehends games as an aid for the passengers to relieve stress and aches on long trips. This can include exercise games based on moving one's arms and head to affect various game events displayed on the screen, and also in audible form, using if desired earphones to avoid disturbing others. The camera of this system can also be used to view the occupants for the purpose of playing games, such as those described in my co pending applications or other commercial types of this genre such as the Sony Eyetoy game. For this purpose it is preferable to use a camera viewing the users (in this case players) from the front, and either one camera such as 2152 (also analyzed by computer 2135) can be used to view the two rear seats in the second row of seats 2115, and another farther back in the vehicle (and not shown for clarity) can view the players in the $3^{rd}$ row 2016. For optimum performance there should be a camera per individual seat, and if two rows of rear seats the two cameras viewing the passengers in the second row, can also be used to view those in the third, to the extent they can be seen behind the 2nd row passengers. Alternatively, a second set of cameras can be used specifically for the third row. Cameras for game play are most typically located in the headliner of the vehicle or the overhead console where the display is typically located. However, cameras can alternately be located in the sides of the vehicle in the portion of the headliner near the doors. In this case an illumination source used can double conveniently as a reading light, and be used for illumination of lap based gestures (or object movements) using the hands of the person in the seat, rather than raised hands and head gestures used (or object movements) when cameras overhead frontally viewing the players are used;

If the game is to be played a night, it is desirable to have IR (near infrared, e.g., 880 nm) illumination from IR LEDs such as 2140 so as to not bother the vehicle driver with bright light. If an "Eyetoy" type game with the player in the picture seen on the display such as 2100 is played, the players see themselves using light from the illumination source as detected by the camera. Alternative to the use of IR, one can have visible LED illuminators directly on them so they don't bother the driver unduly, especially if the illuminator is in the deep red range, rather than a white source. Even if the projection is in the red for example, the color on the display screen can be converted more toward flesh tones by the display computer if desired. This allows a standard color camera to be used, picking up at least some red signal, while having a more realistic display.

In daylight the problem can be quite different, since significant sun loads can exist in the vehicle even with tinted privacy glass in the rear seat areas. In this case the IR or red illuminator just described can be used in conjunction with retro-reflectors used in the game, either on the persons or the objects used. This works at night too. Alternatively, and/or in addition, very distinct colored reflection devices or objects such as ball object 2160 held by player 2155 can be used. One can detect the objects used or the markers by shape as well as color, and these can be on a hat for example of the player, or on his fingers, wrists, or other body portions. All these possibilities are discussed in my co-pending applications and patents referenced above.

The invention particularly comprehends games which would be played by one passenger in relation to computer generated images on the screen, or which would be played by one passenger against another, also in relation to images on the screen generated in the computer or taken from the position of the players themselves. These games are particularly played with the head and hands, or fingers for milder games, since the person is assumed belted in. The game can add to desirable exercise on long trips, and it is contemplated that some games would really be more workouts, made interesting by monitoring positions and movements of the players in order to create feedback to them relative to a score for executing a game play desired movement or sequence of movements, or even a number of repetitions in a given time period, or the like.

There can also be special games relating to things along the trip route, which for example can include the steps of listening with a microphone 2187 to words said by the players and causing video or other game data to be altered accordingly, though use of voice recognition or other suitable programs. And there can be games, which relate to video imagery taken by cameras looking outside the car.

Movements of hands and fingers can also be used to control the projection unit for other purposes, such as Internet access or navigation as disclosed in co pending applications. This extends the justification of the device beyond just games.

FIG. 22 illustrates a game play from a view looking forward in the passenger compartment of the vehicle, in this case a minivan with three rows of seats, and further discloses calibration of camera using datum's on seats or other vehicle portions. As shown there are two cameras 2201 and 2202 looking at players 2230 and 2231 in the right and left seats 2240 and 2241 of the second row. Computer 2210 analyzes the image of both and the image from each is displayed on the right and left side of the display 2220, also controlled by computer 2210. The camera and display screen are attached to the headliner of the vehicle 2215. The display can in effect be two separate images split down the middle. Alternatively, using known video mixing techniques, one may stitch the images together so the two players' images are on the screen seemingly being observed by one camera.

The cameras can also see players located in the third row at least those points not obscured by players in the second row. This allows 3 and 4 person games to be played, or games where the second row competes with the third (since it is possible using the size of the image ($3^{rd}$ row being smaller) or using other techniques such as colored objects held in the players hands, or on their persons, to distinguish between $2^{nd}$ and $3^{rd}$ row players. A camera can also be used in the right front passenger seat to allow that passenger to play, assuming the display needs of the passenger are met by a center stack display, or more appropriately, a display on the surface of the instrument panel ahead of the passenger, for example by projecting on that surface.

Also shown is an alternative or additional headliner mounted camera such as 2250 on the side just above the rear sliding doors of a minivan. This allows the players laps to be seen if it is desired to play games on ones lap or below the rear view mirror visibility region, for example to not disturb the driver, who may or may not be bothered by hands or heads bobbing around in the rear seats. Clearly other such cameras (typically one per seat) may be used as well.

An issue with such camera based devices for the sensing of positions, orientations or movements of objects or people parts is the calibration of the camera. Properly made systems should not move in their lens position or other variables of the camera, but there is always the possibility of the camera being hit and knocked somewhat out of alignment. To check this, it is useful to place datum's on fixed items in the field of view, especially those that may relate to the location of the person playing a game or otherwise interacting with the camera system. For example, if one uses the camera 2201 to also see one or more datum's 2270 and 2271 on seat 2240 this allows one to correct the location of the camera axis to the seat, should the seat (and the person) or camera be moved. Particularly useful is to place two or more datum's on the seat, or on the side of the vehicle such as 2275 in order that the seat location and the distance of the seat to the camera can be determined (by determining the baseline as seen in the camera of the separation of the datum's 2270 and 2271 which are in fixed positions on the seat. Where needed auxiliary LED lighting can be used such as 2280, as discussed above.

As noted elsewhere and in co-pending applications the above apparatus useful for physical type games moving hands, heads and/or objects can also be used as an input to the display 2220 control computer 2210 for the purpose of navigation, internet access, or other purposes of value while traveling in vehicles. As pointed out in my pending applications and granted patents incorporated by reference herein, objects used, if desired, may employ discrete targets or other means to allow the cameras shown to be able to photogram metrically determine positions and movements in up to 6 axes if desired.

Figure 23:
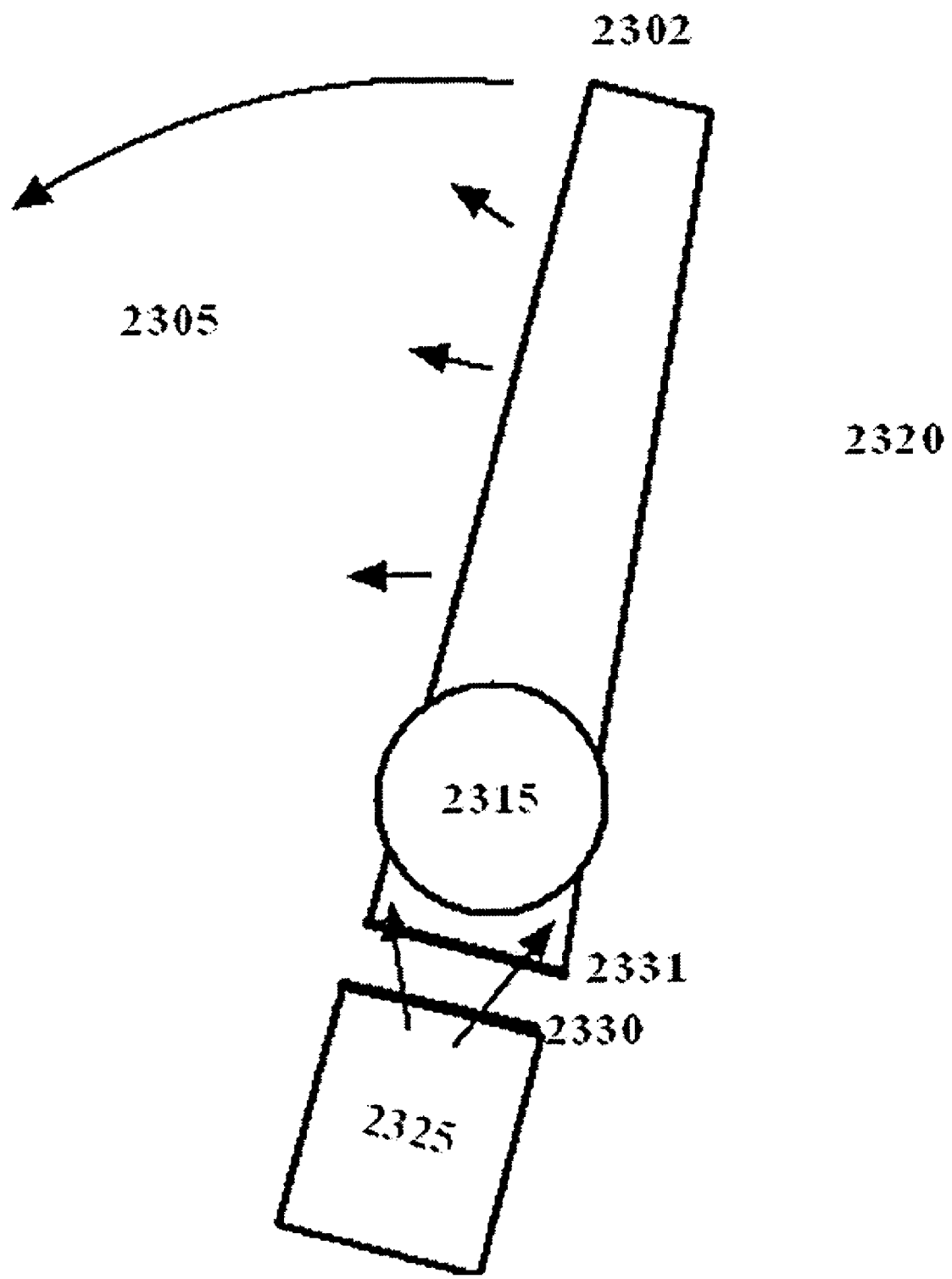
FIG. 23 illustrates an alternative flat panel type rear projection device, which can be folded as required for access to the region behind it.

FIG. 23 illustrates an alternative projection arrangement for an RTD type instrument panel center stack using a rear projection screen 2302 called a "Wedge" screen, manufactured by Camped company in the UK. (camfpd.com). This device allows the image to be projected into the passenger compartment of a vehicle 2305 to be injected by a video projector such as 2310 located at one edge, in this case on the bottom. This leaves more room behind the screen for other items of the vehicle, and if the screen is hinged at the bottom, with for example a hinge or a rotary member 2315, it can fold downward to allow access to the area 2320 behind, since the light can pass thru windows 2330 and 2331 respectively of the projector 2325 and the wedge screen 2302 when the screen is back in position. Similarly a camera or other electro-optical sensor (which may be combined as noted in co-pending applications as part of the projector itself) can be used to sense the position of finger touch or location of physical details on the outer surface of the screen as described in co-pending applications.

The use of a LCD flat panel display rather than a projection type allows a different cost and development dynamic to come into play which can be valuable for achieving commercialization in the near to mid term, since LCD flat panel displays at the lower end of the price spectrum are more developed than projector displays. In the LCD flat panel case where the image generating media, in effect comprising the screen itself so to speak, one can relax the lighting and optics required behind the screen from that required for a projection system. But one looses the ability to at least easily have a large irregular or curvilinear shaped screen made possible with projection.

On a typical vehicle such as a 2005 Cadillac STS displays for both the radio (audio) and heater (also known as HVAC, or Climate Control) portions in the center stack region of the instrument panel are provided today by the 8 inch diagonal touch screen at the top, requiring the driver to make a long visual jump, especially for heater data, from the heater section at the very bottom of the center stack to the display at the top. In addition the controls use at least 3 and possibly 4 time based +/− rocker switches for radio scan, heater blower speed, etc. These take more concentration, though the invention can also provide time-based switches.

One can employ in a vehicle such as the STS a version having a large display and control surface of the invention (either flat panel based or projection based, though the latter is more versatile) arrayed with its long axis horizontal with vents beneath (instead of at the sides as in the STS). The display is a 15 inch diagonal type widely used on laptops today. It effectively is 13 inches wide, but actually is slight larger due to sealing around the edge. In this example, the display has been placed such that top of the display screen is at the top of the instrument panel or even a bit sticking up above as shown to be more in the drivers line of sight, to give the easiest to see view of camera images displayed for rear view and blind spot views, as well as provide other useful data in an easy to see location. Three knobs are shown on the left of the display as disclosed in FIG. 11 but any combination and location of knobs and other controls can be provided, for example some knobs or switches could be along the bottom of the display, or provided virtually there, since as before the screen surface can also be a touch screen.

The vents may be relocated to a region just below the display, with a CD slot underneath that the area below, has been freed up (since the heater and radio both are now controlled from the large display of the invention). This space can be used for other audio equipment, other switchgear or whatever. Note that the poor location of the STS heater controls too far down the center stack to work or see for some people, has now been obviated, since the heater is now operable in the time honored knob turning/switch pushing manner (or slider moving, or both) from a control of the invention much closer to the drivers sight line. Note from a safety point too, the display can be much bigger than the present 2005 STS one, which is the largest currently in use (also by Acura, perhaps others). It is 4 times the area, a big advantage in looking behind you at children playing behind the vehicle, for example.

Practically speaking, a person can only touch one region at once in many versions of the invention. Thus as described in co-pending applications, it is noted, using some configurations of sensing and projection illumination, upon a determination that a touch has likely occurred in a particularly location, that one may increase the projected intensity into the touch region in question to assist in optical touch determination. This is particularly straightforward using flying spot type devices such as shown above, where one region of the screen (in this case the touch location) can be favored over others (e.g. the non touch locations, or other regions not suspected of having meaningful information at the time).

It is possible to use two LCD displays, the upper one for display only or display with a conventional touch screen input, and the lower one according to the invention. The display quality of the lower unit can typically be reduced from that of the upper unit as discussed herein since in this case it is not used for display of high resolution images, but rather audio and climate control system data and data from auxiliary sources as desired. A difference in inclination angle of the two displays can be made, to provide an approximation of curvature. The outer trim can have a continuous curve to give a curvilinear feel. One can have a side-by-side arrangement of such displays too. For example a large display and control surface could be split in two physically, to where each was according to the invention or, functionally, to where the camera unit was only needed for the left half where the controls were (near the driver) and the right half was display only. This allows a reduction in depth, since the camera throw distance to the screen need be less, as area coverage required is less. This argument also holds for projection displays as in my co-pending applications, where projection throw is also so reduced. The above approach makes more sense in the vertical dimension in the center stack, where the lower set is controls and the upper is display. But best is when the whole thing can function in a control sense.

While the invention has been described in connection with numerous embodiments, it is to be understood that the specific mechanisms and techniques which have been described are merely illustrative of the principles of the invention, numerous modifications may be made to the methods and apparatus described without departing from the spirit and scope of the invention.

What is claimed:

1. An instrument panel for vehicles or other applications comprising:
   a rear projection screen and controls surface having a plurality of physical controls affixed thereto
   a fixed image projector for projecting fixed image data onto a rear projection screen and control surface, said fixed image data relating to a control function of at least one of said physical controls,
   means to sense a user input command on said control surface, and computer means for determining a control function from said input command.

2. Apparatus according to claim 1 further including an additional fixed image projector.

3. Apparatus according to claim 1 further including a programmable optical image writing device to write information over said projected fixed image.

4. Apparatus according to claim 1 further including a variable display for displaying variable image information.

5. Apparatus according to claim 1 wherein said input command is a finger touch location.

6. Apparatus according to claim 1 wherein said input command is a control detail position.

7. Apparatus according to claim 6 wherein said control detail position comprises the position of one of a central knot and a slider.

8. Apparatus according to claim 1 wherein said input command comprises a physical touching of the screen by a user.

9. Apparatus according to claim 1 wherein said input command comprises physical touching of a central detail by a user.

10. Apparatus according to claim 9 wherein said control detail comprises one of a control knob and slider.

11. Apparatus according to claim 1 wherein said fixed image projection comprises a slide projector.

12. An instrument panel for vehicles or other applications comprising:
   a plurality of fixed image projectors each projecting fixed and unchangeable image data onto a rear projection screen and control surface of said instrument panel, only one of said projectors being substantially operable at any one time,
   means to sense a user input command on said control surface,
   computer means for determining a control function from said input command.

* * * * *